H. D. COLMAN.
WINDER.
APPLICATION FILED DEC. 31, 1913.

1,268,684.

Patented June 4, 1918.
29 SHEETS—SHEET 1.

Witnesses:
J. C. Devrik.
George L. Chindahl.

Inventor:
Howard D. Colman
By Luther L. Miller
Atty.

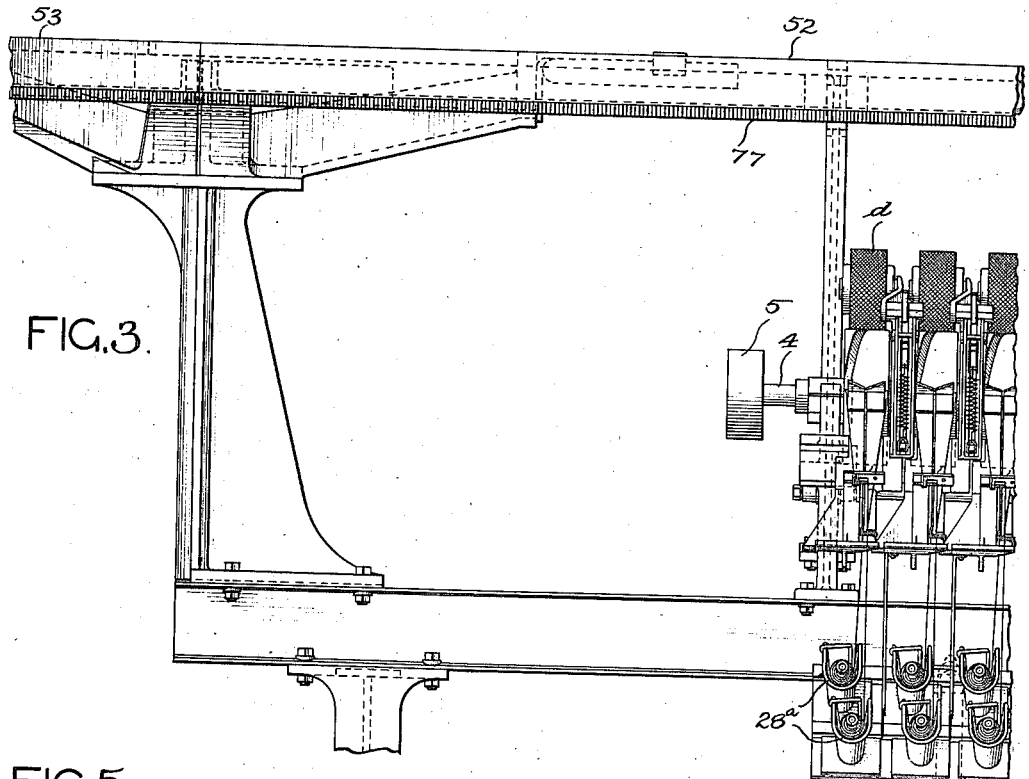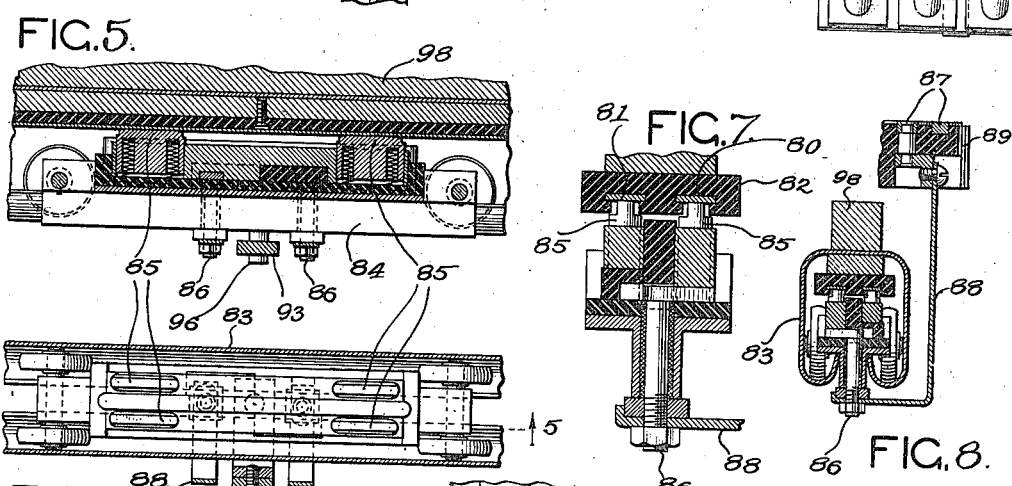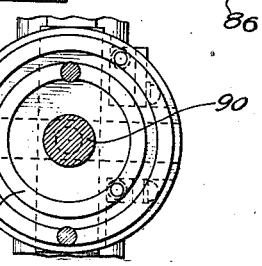

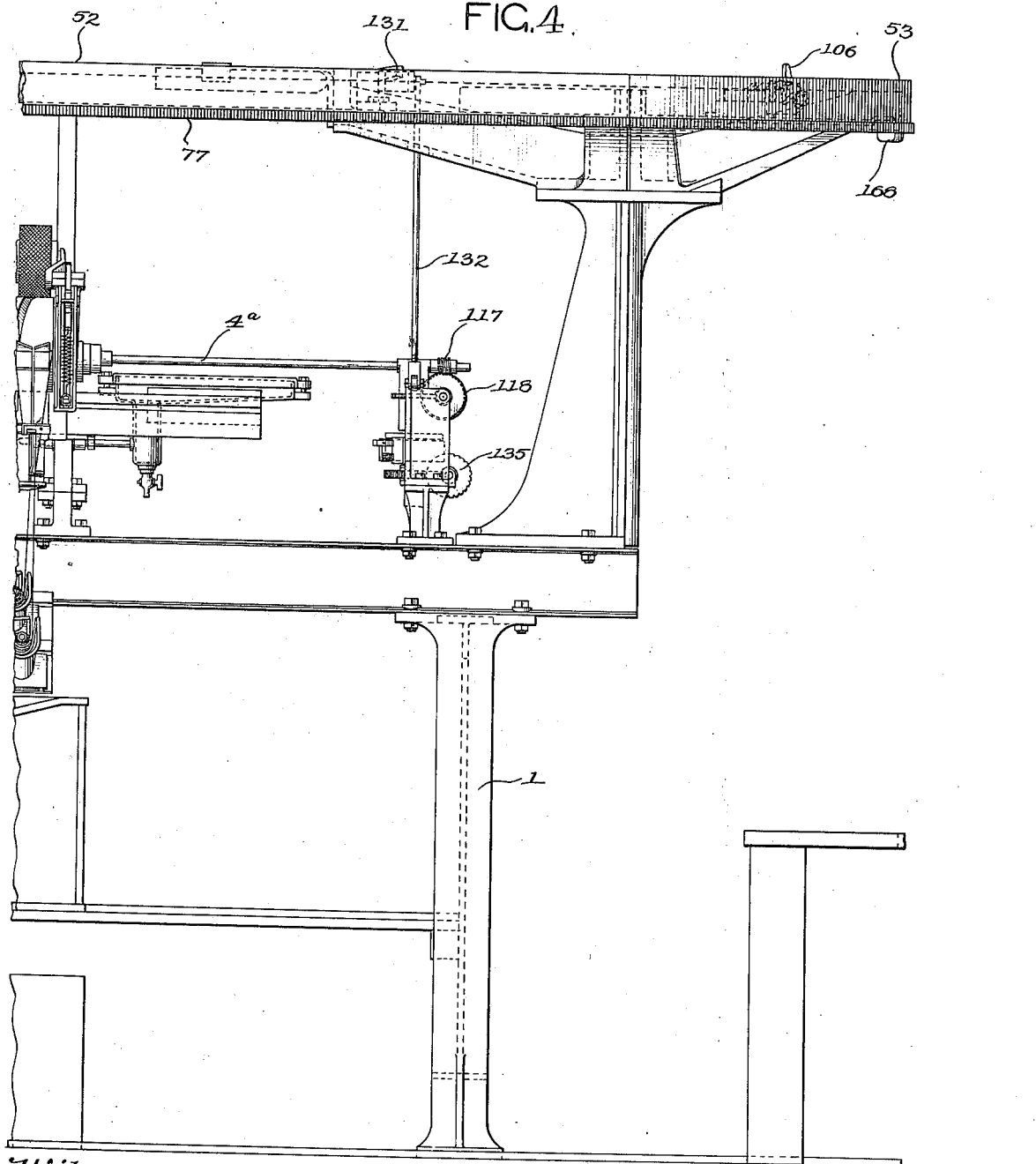

H. D. COLMAN.
WINDER.
APPLICATION FILED DEC. 31, 1913.

1,268,684.

Patented June 4, 1918.
29 SHEETS—SHEET 4.

Witnesses:
J. C. Devick
George L. Chindahl

Inventor:
Howard D. Colman
By Luther L. Miller
Atty.

Inventor:
Howard D. Colman

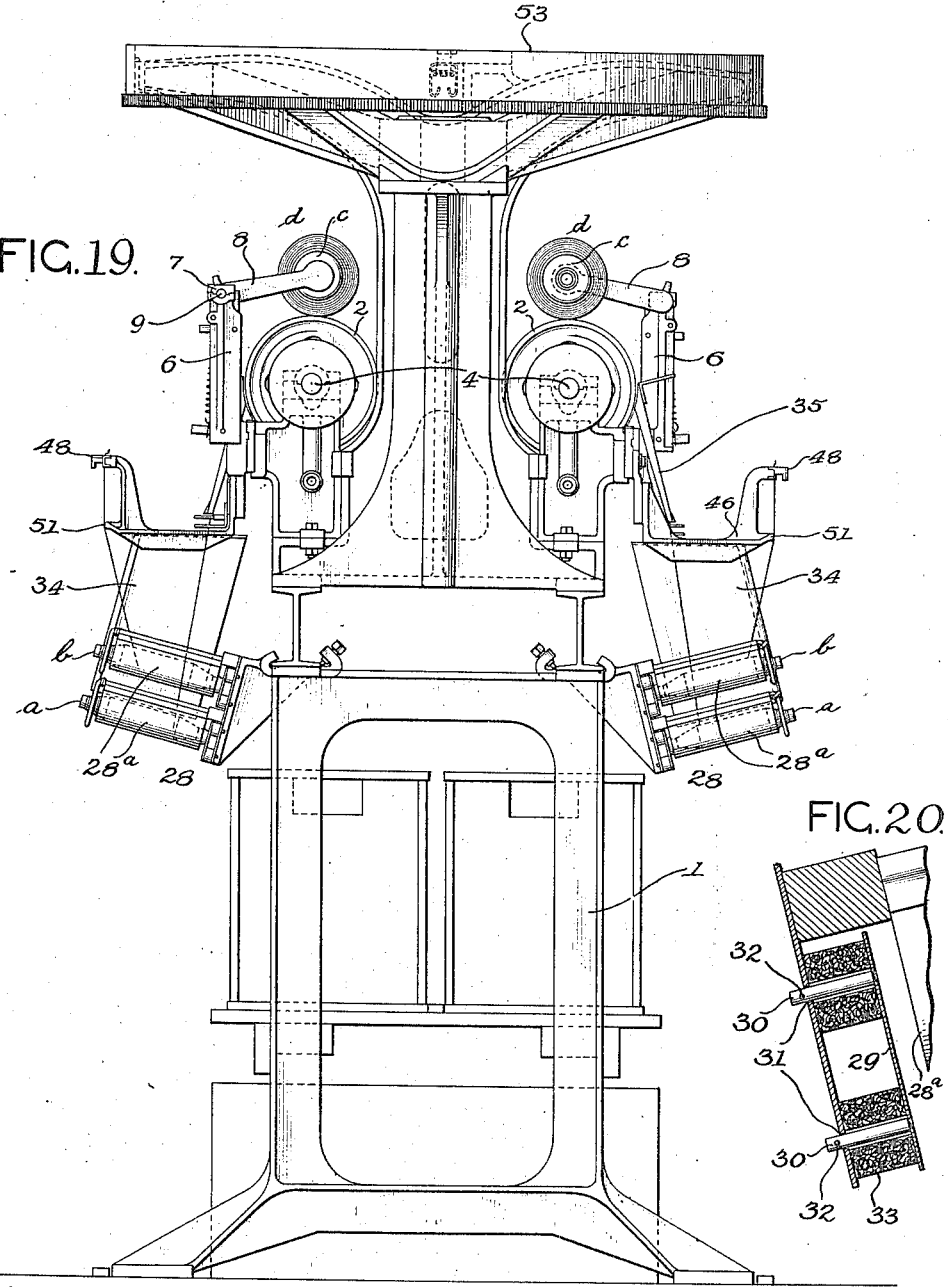

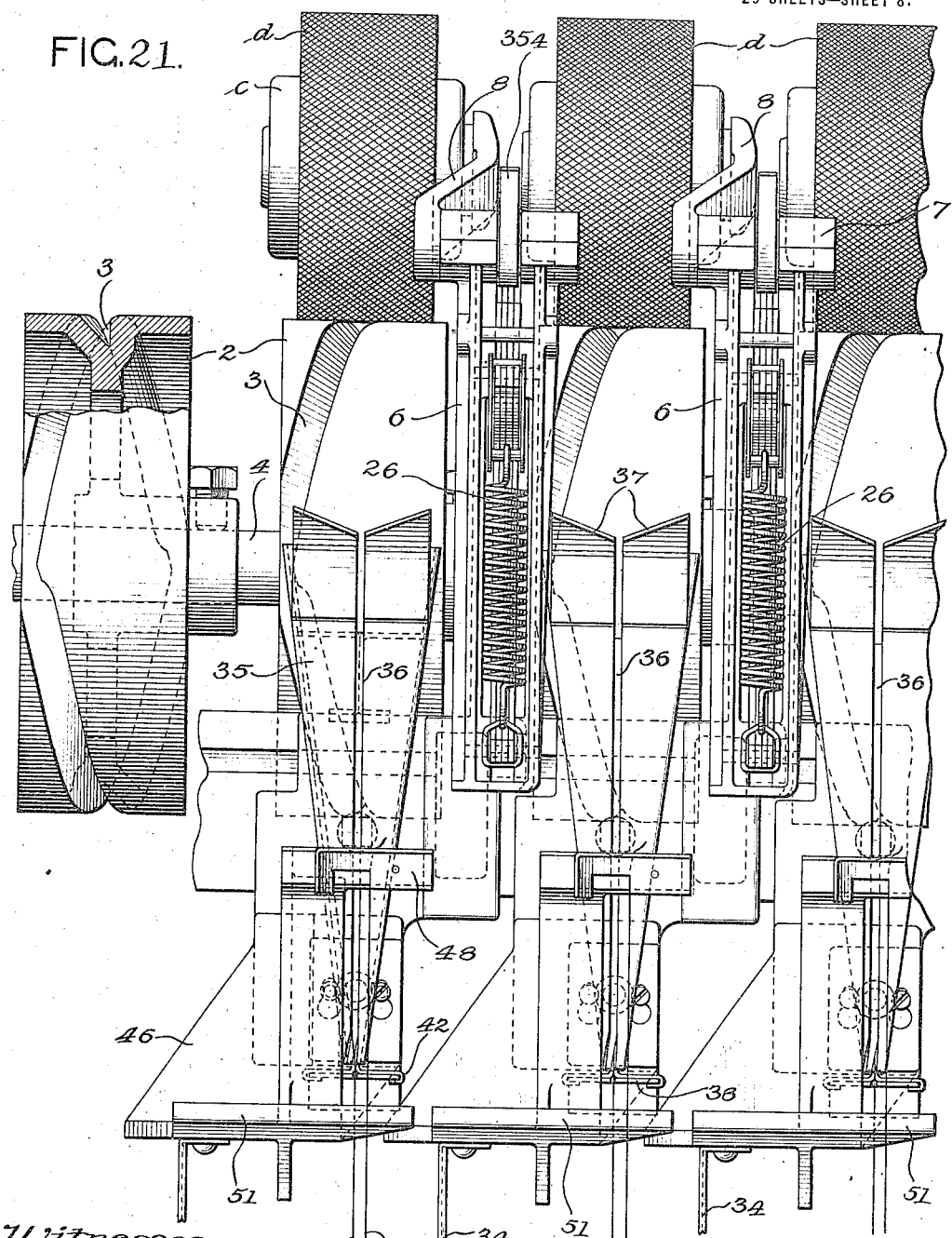

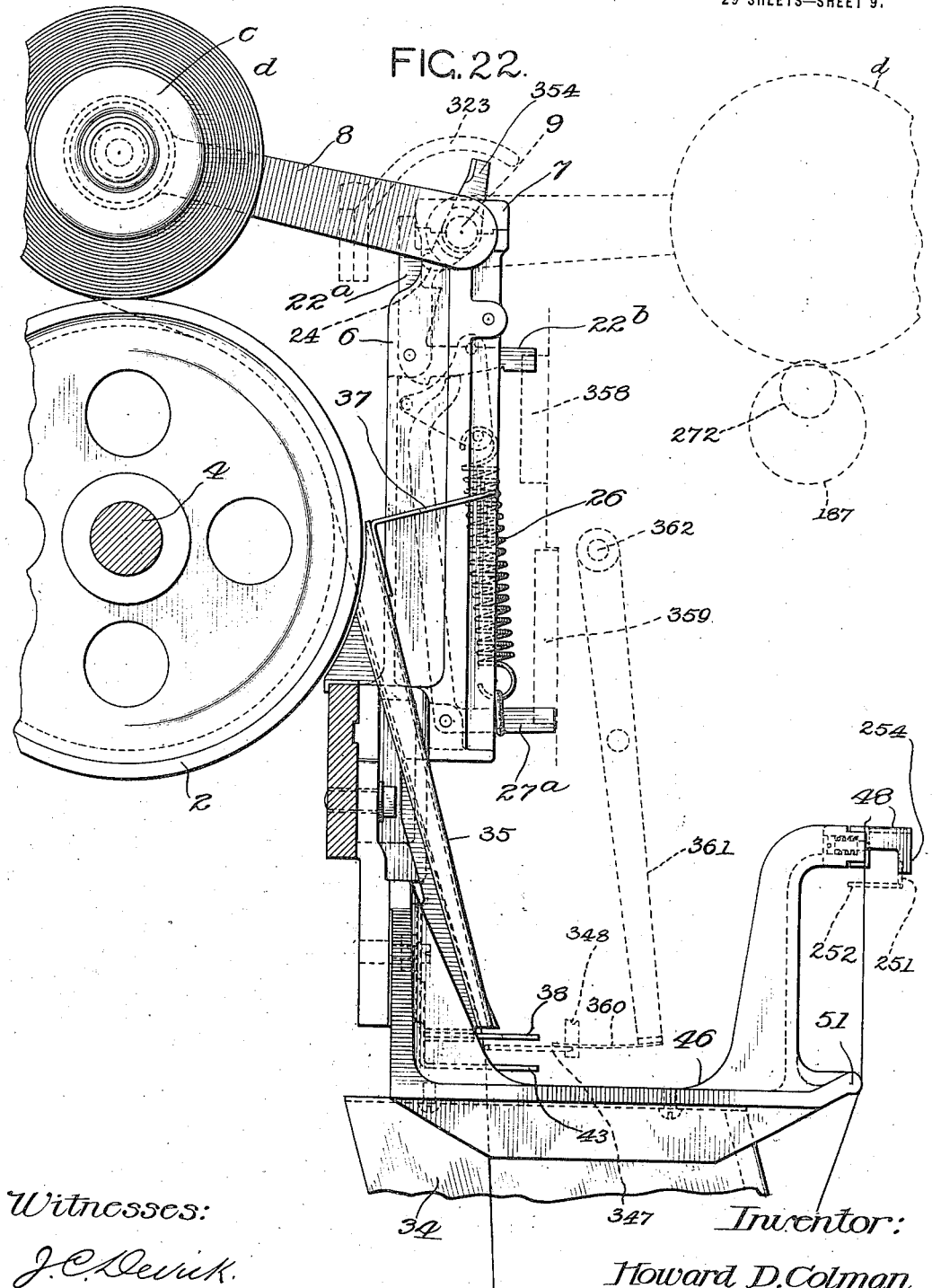

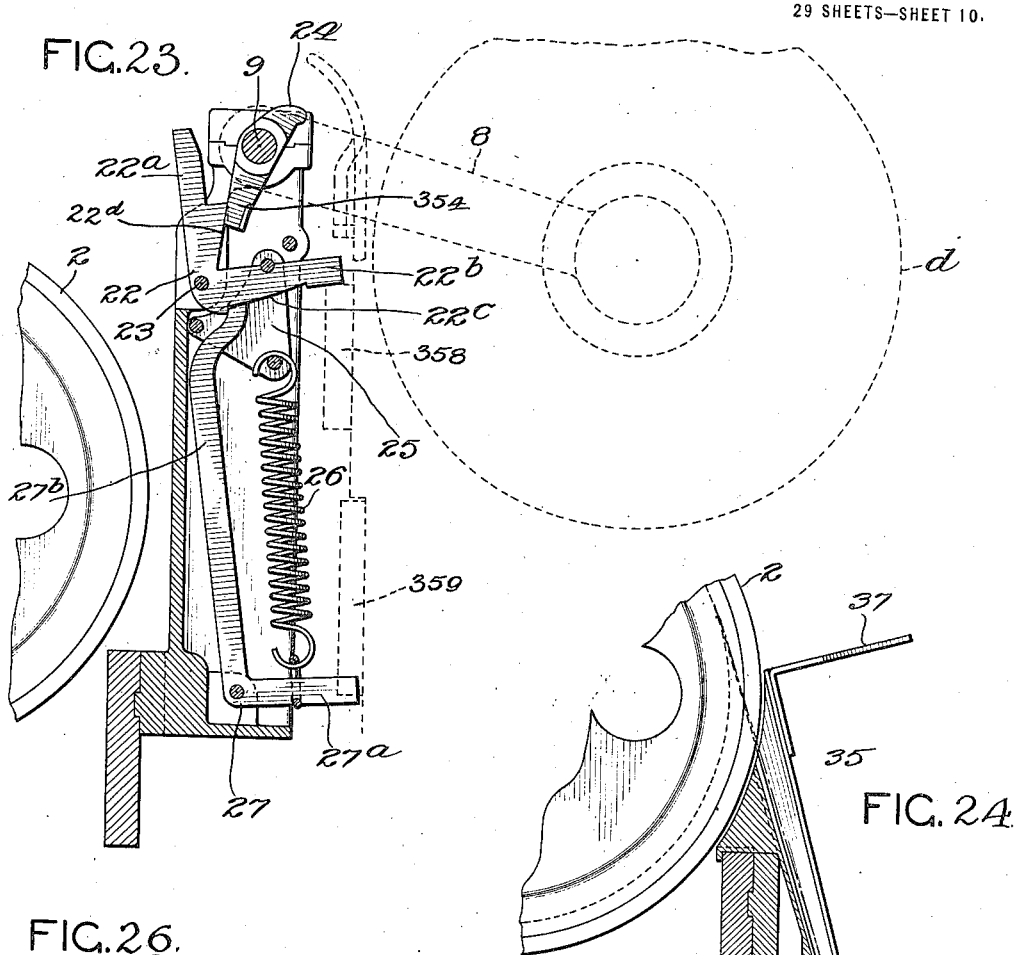

H. D. COLMAN.
WINDER.
APPLICATION FILED DEC. 31, 1913.
1,268,684.
Patented June 4, 1918.
29 SHEETS—SHEET 11.
FIG. 29.
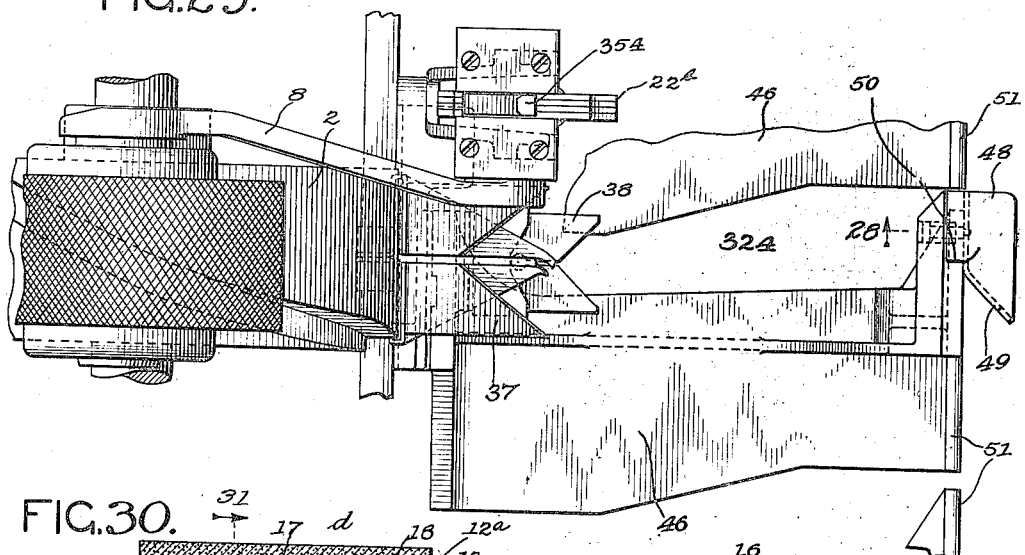
FIG. 30.
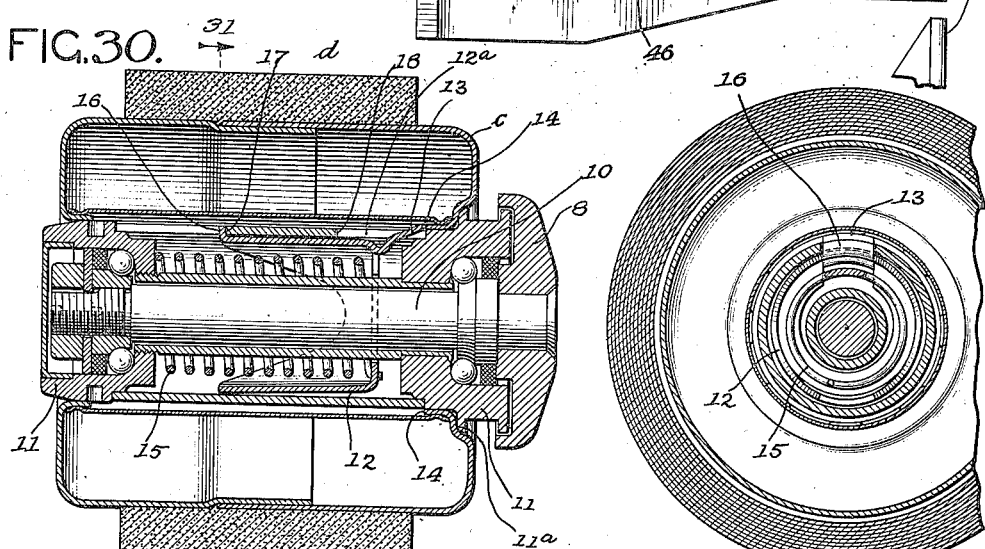
FIG. 31.
FIG. 32.
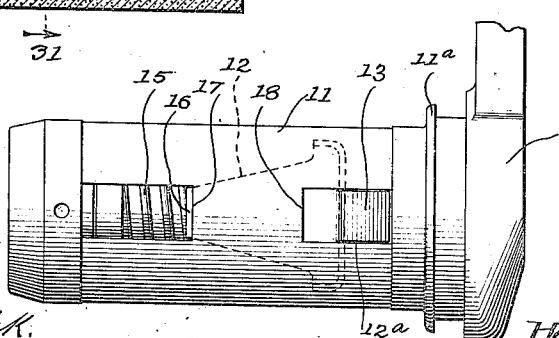
Witnesses:
J. C. Devick.
George L. Chindahl
Inventor:
Howard D. Colman
By Luther L. Miller
Atty.

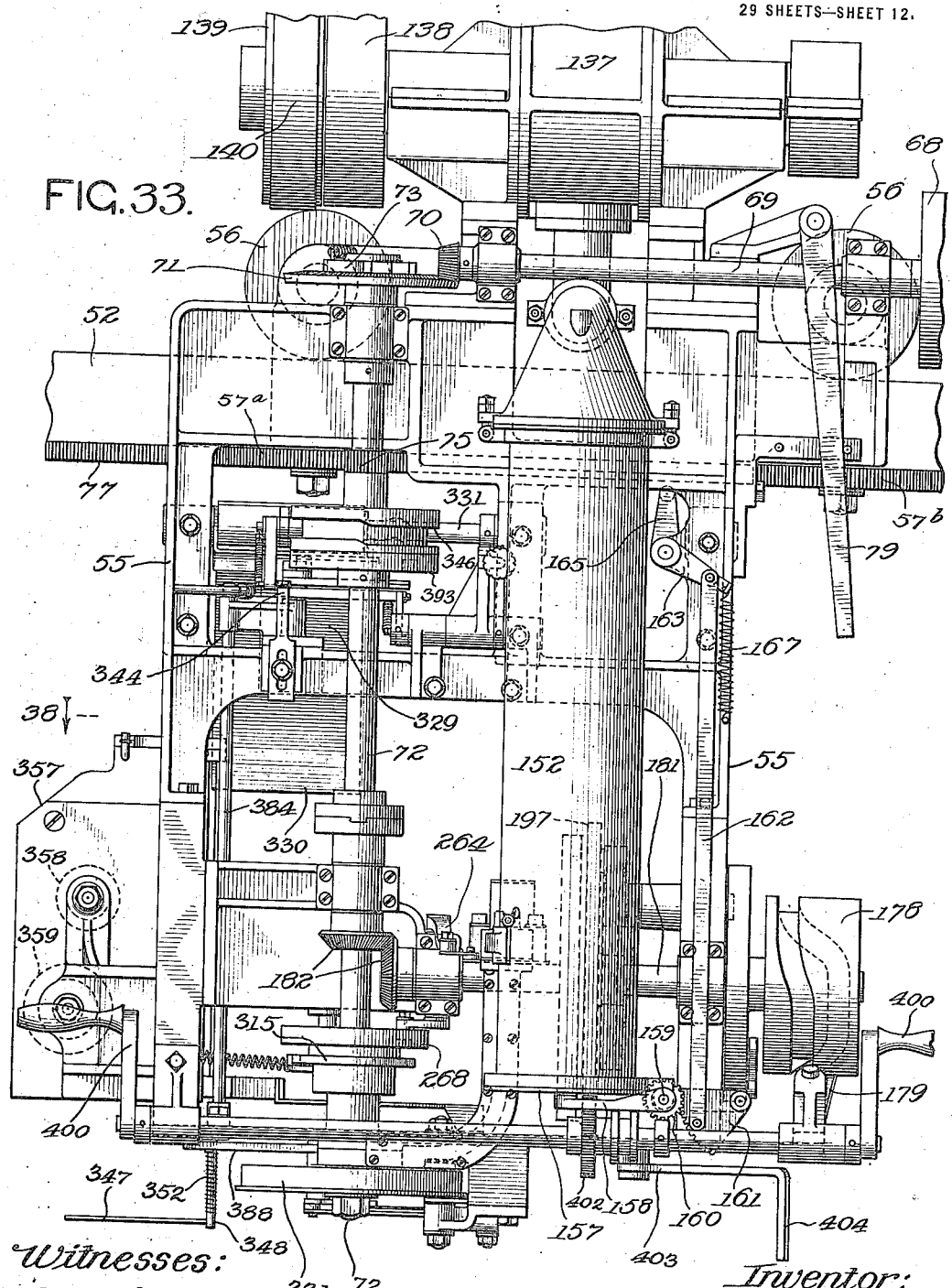

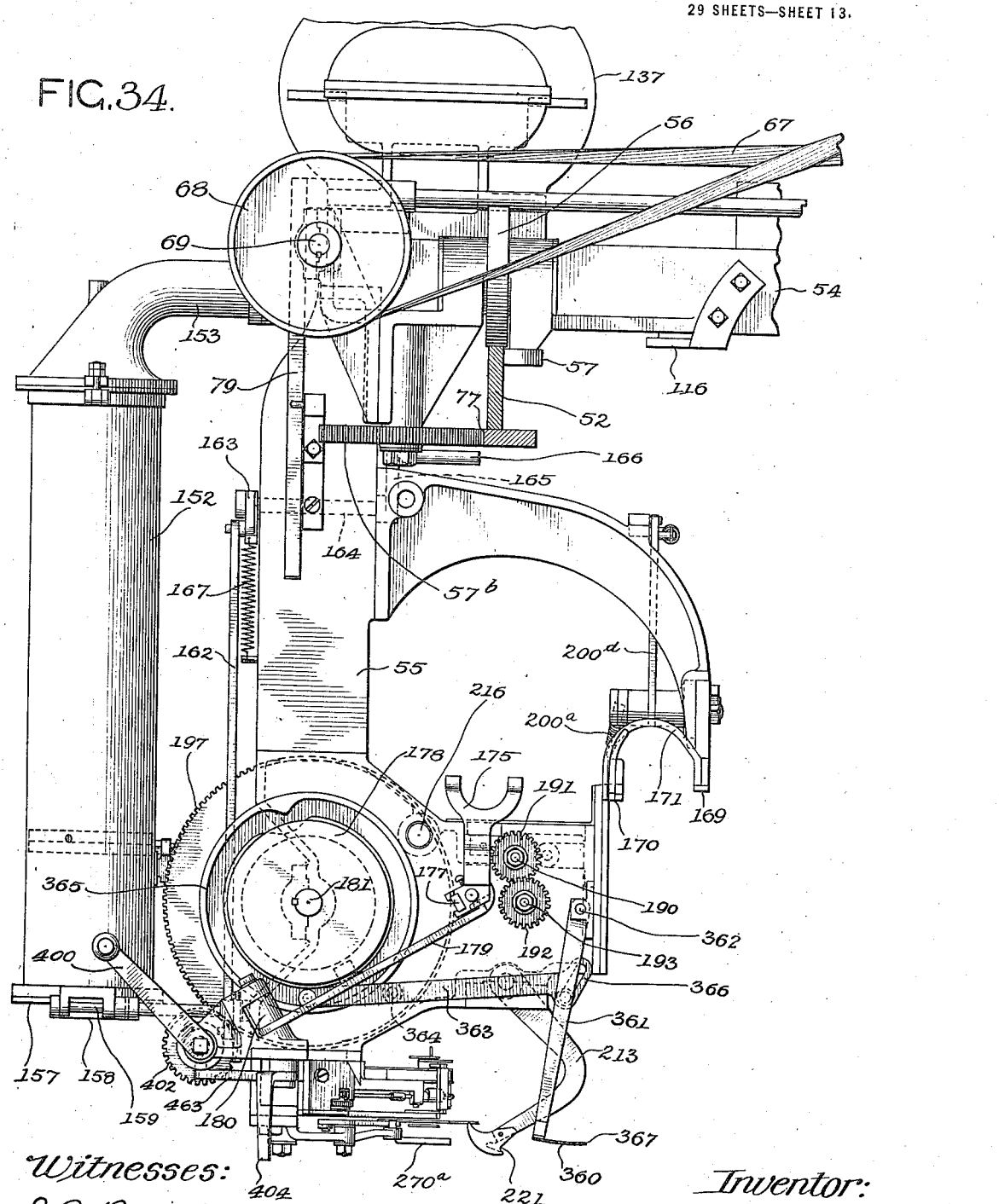

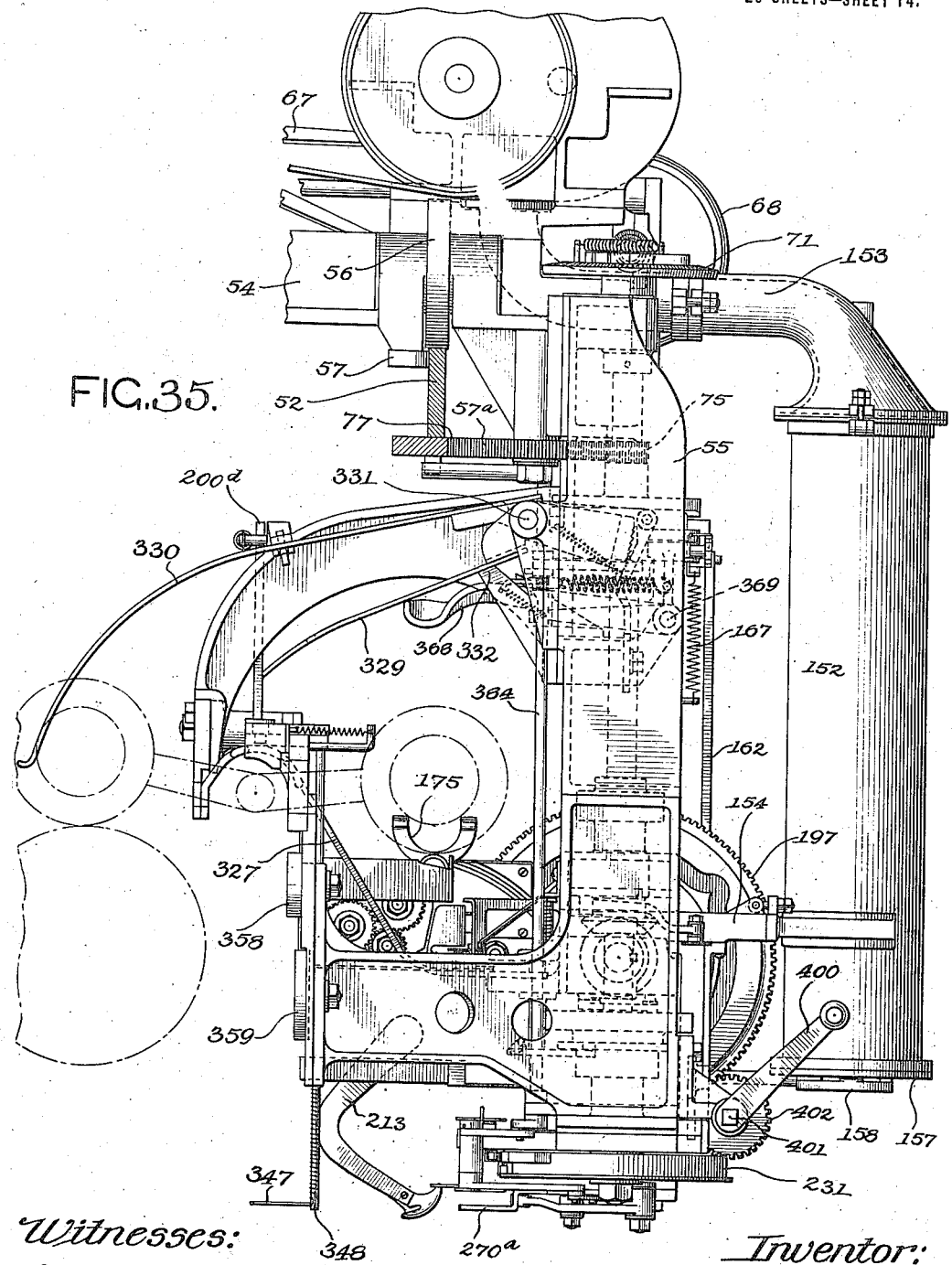

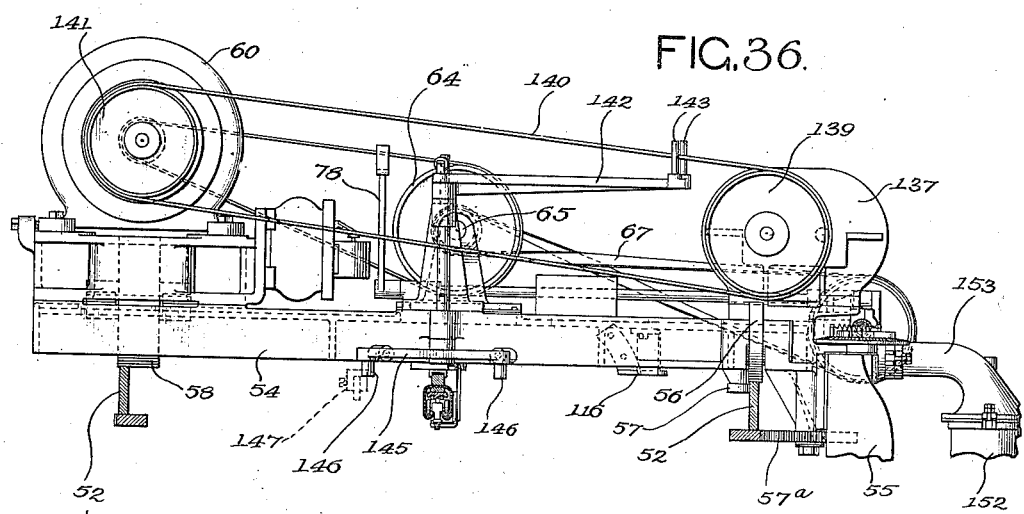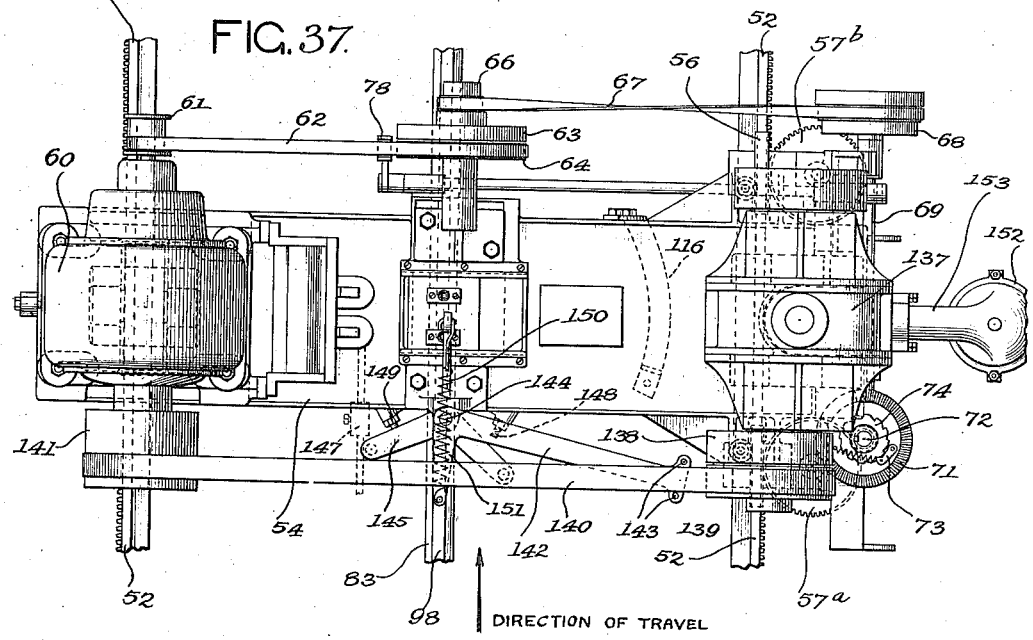

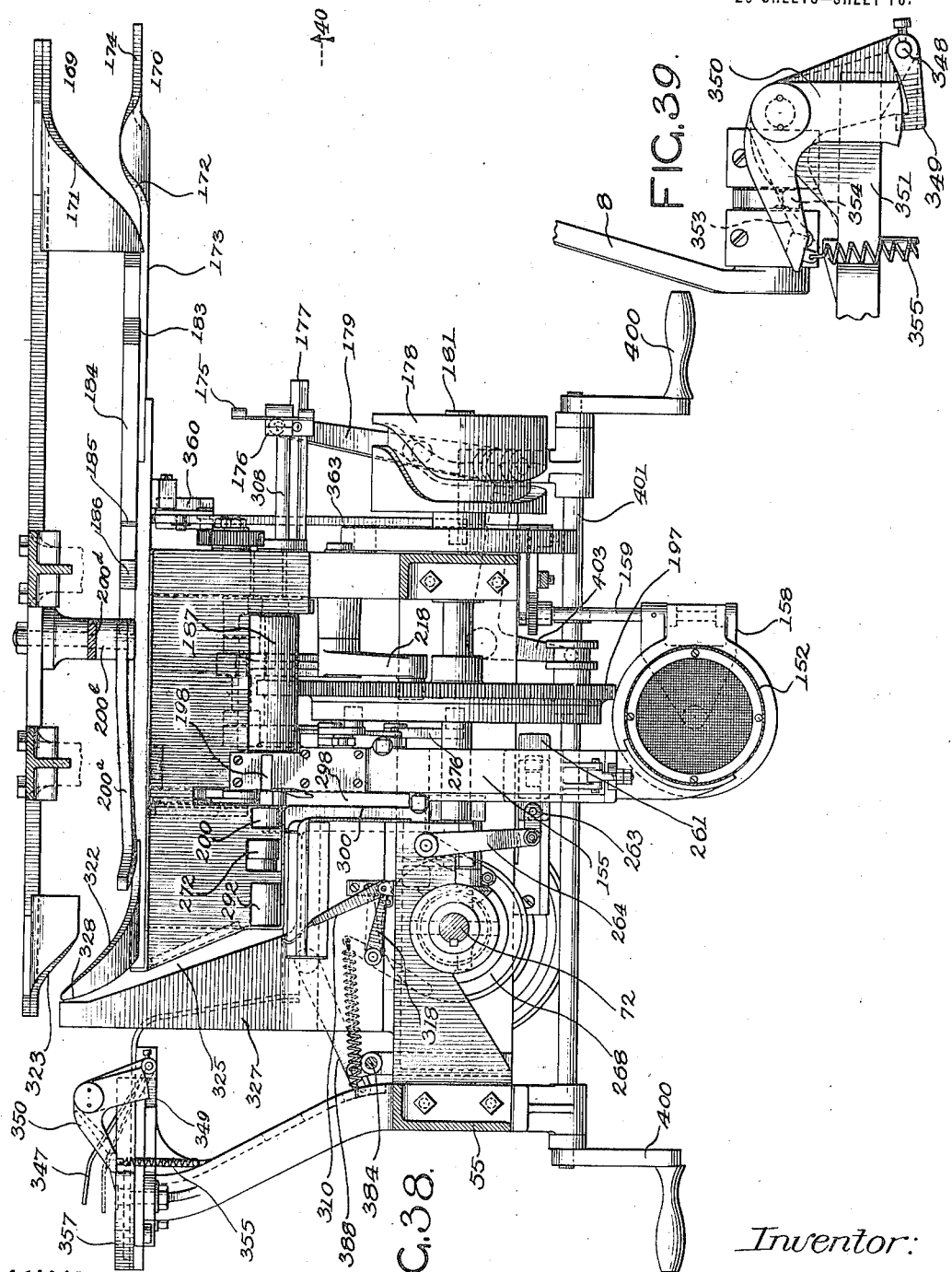

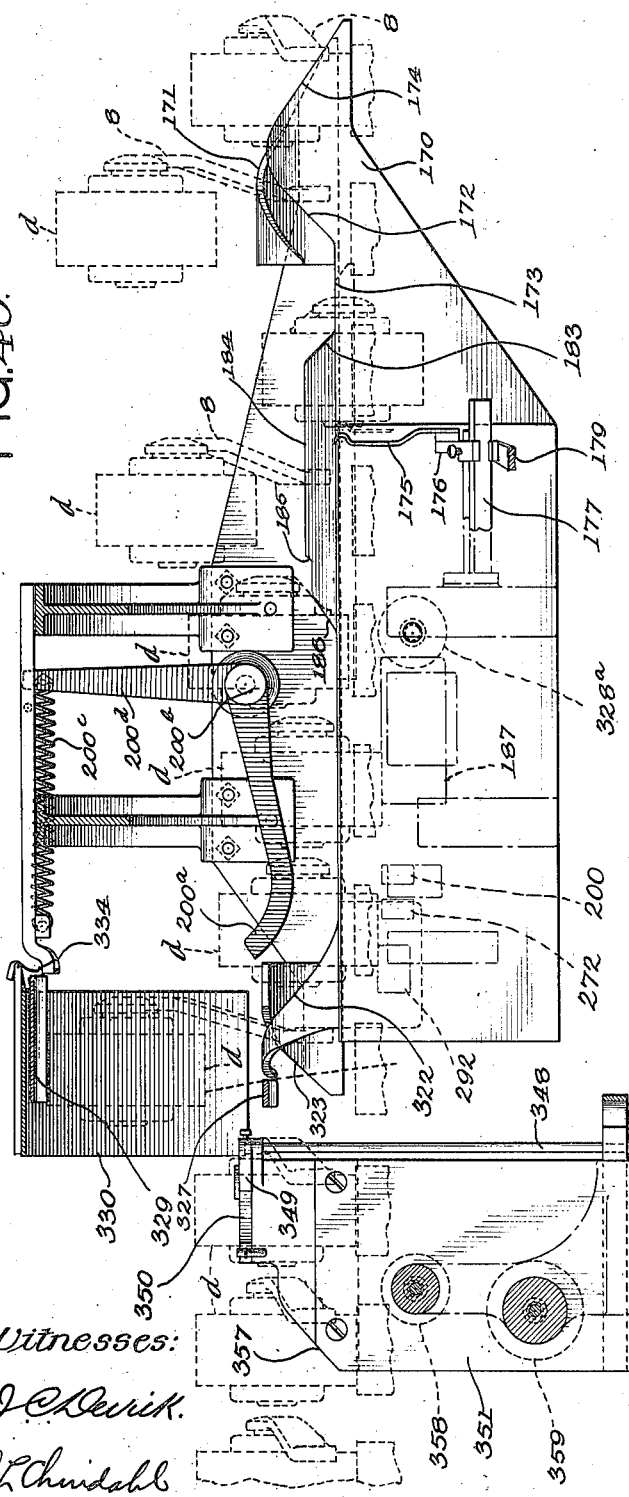

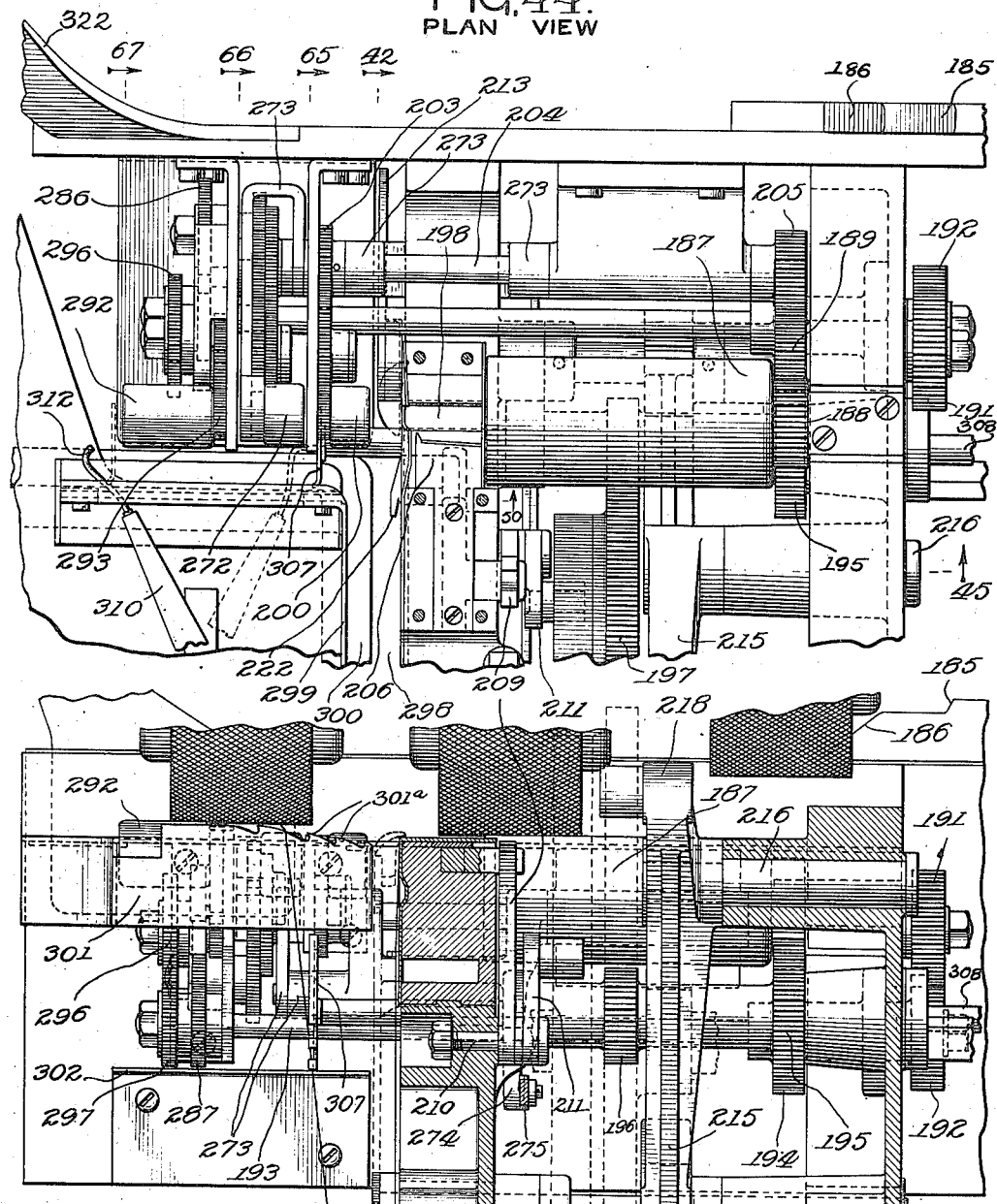

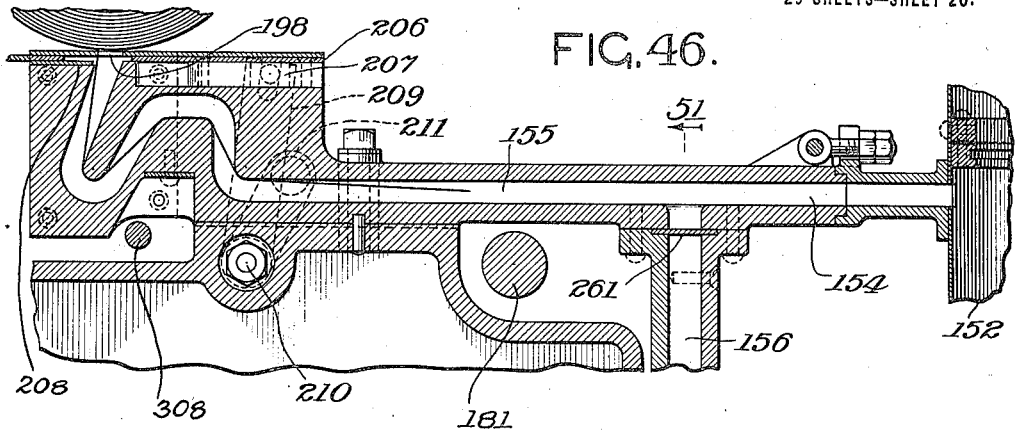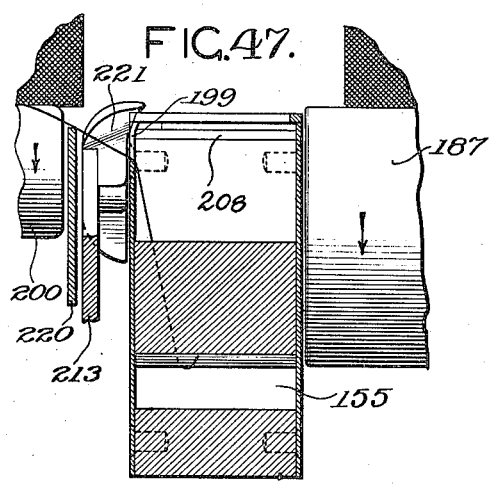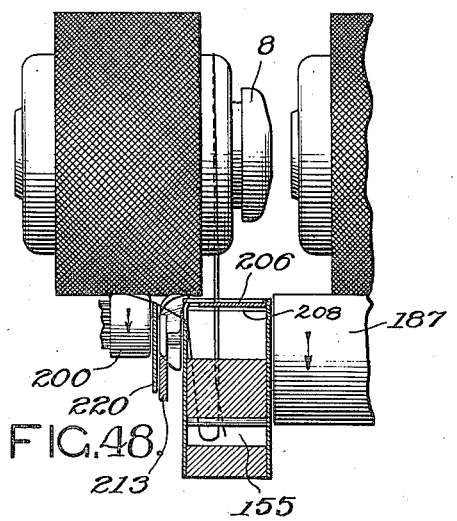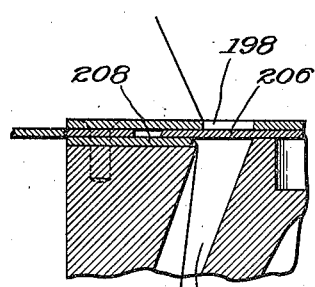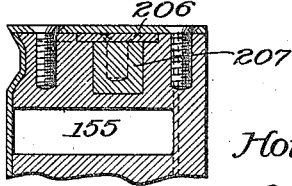

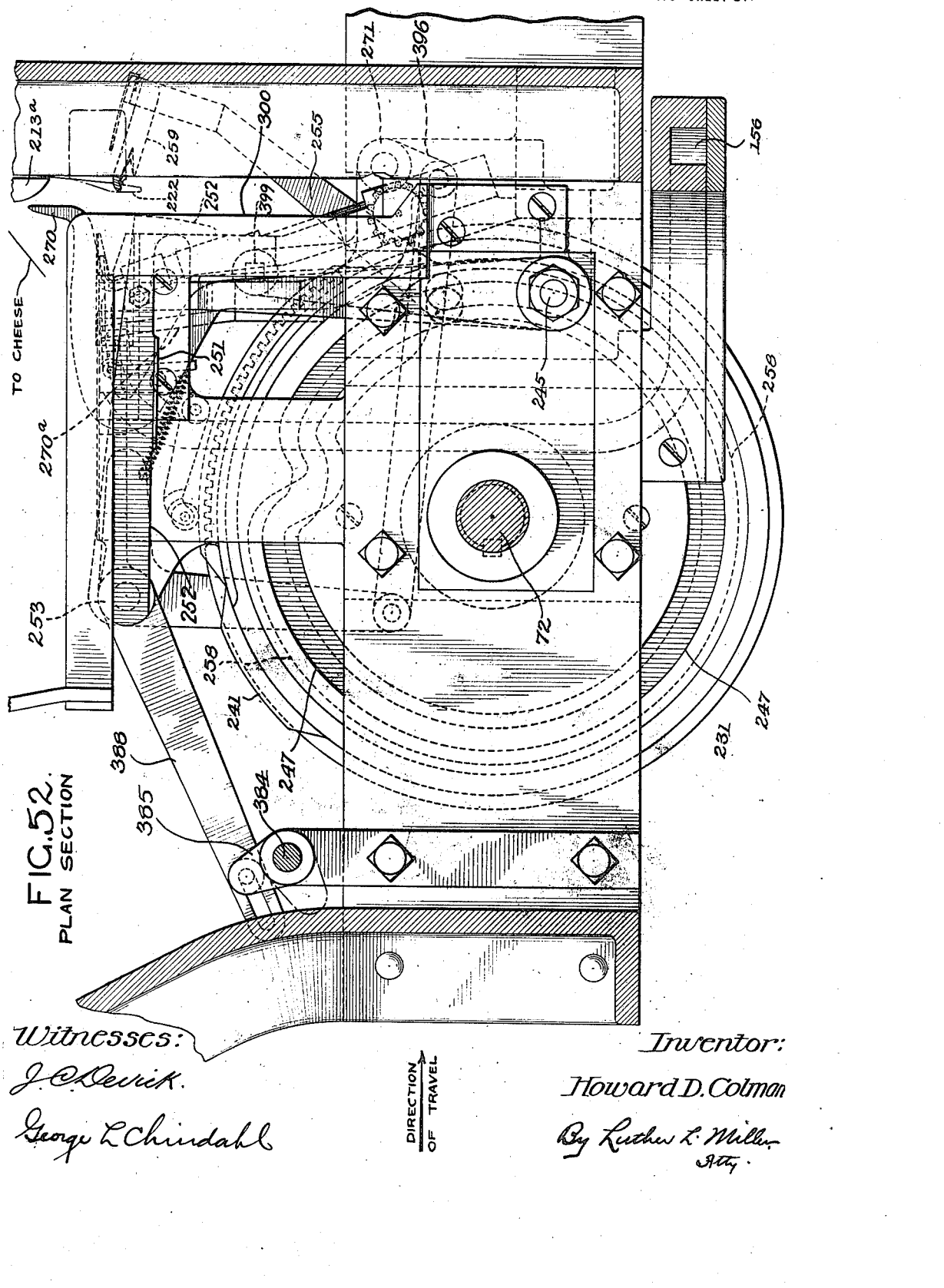

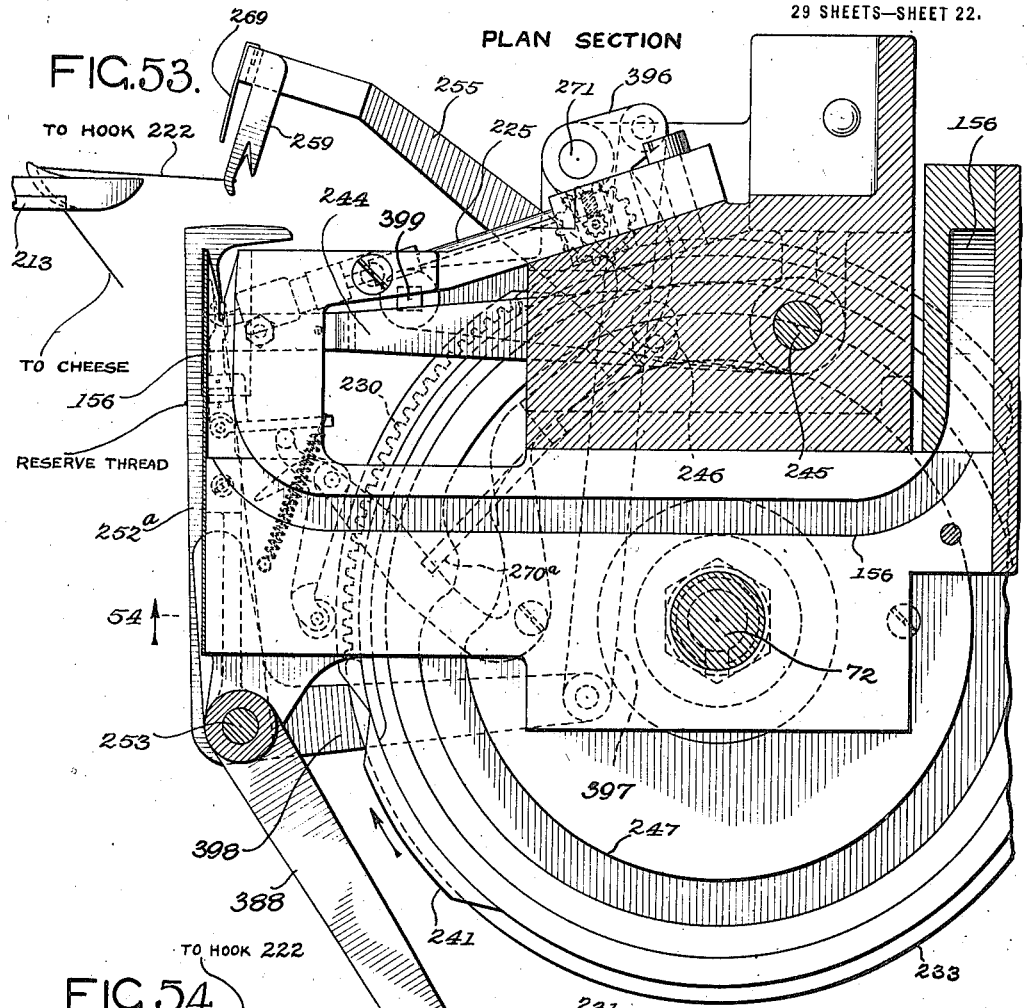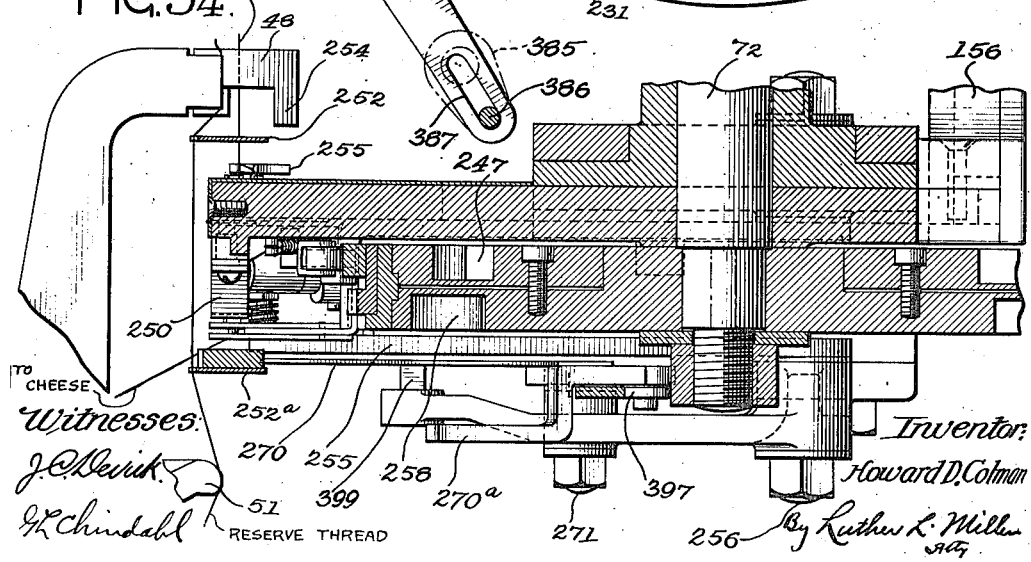

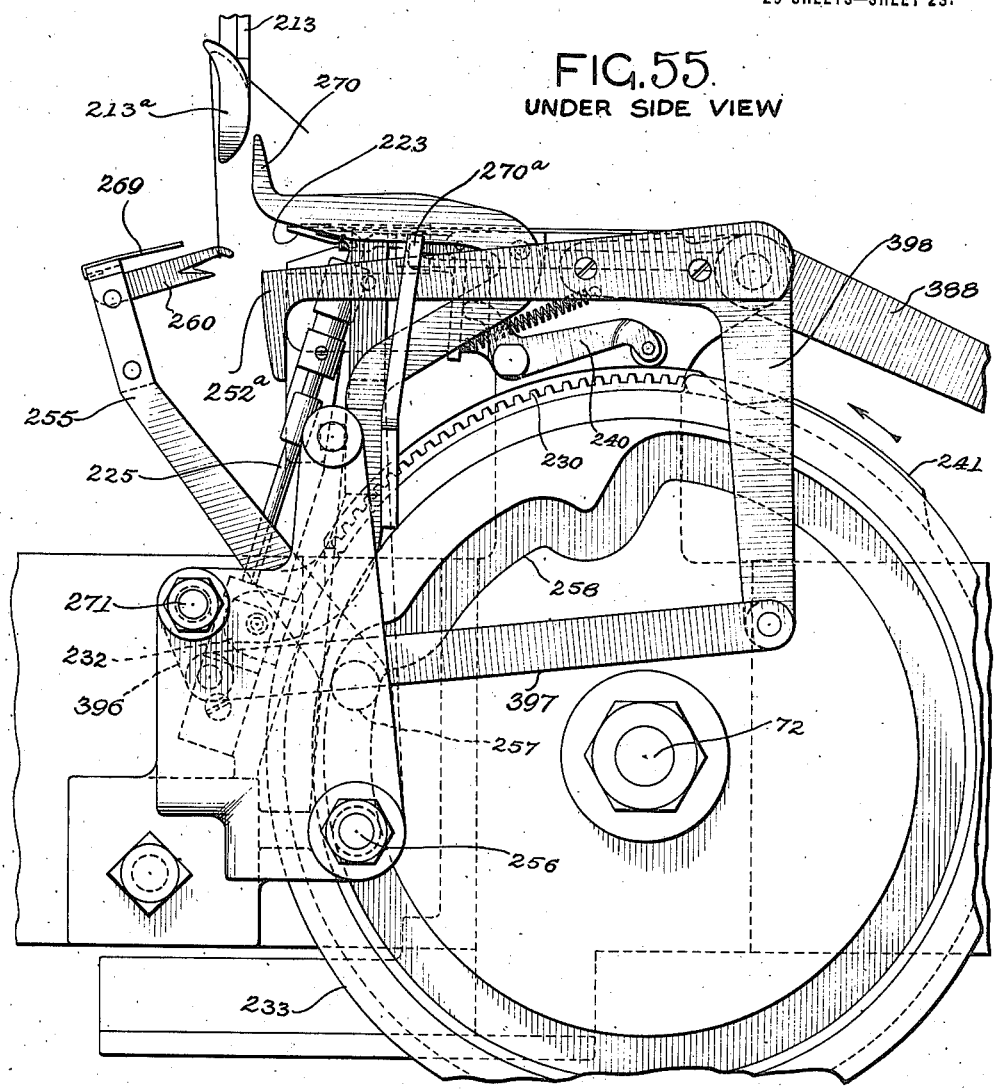
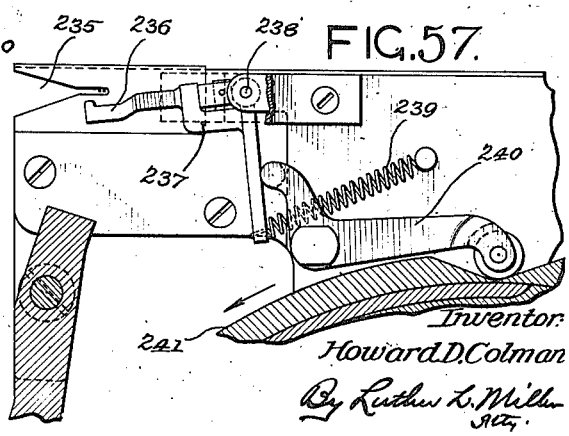

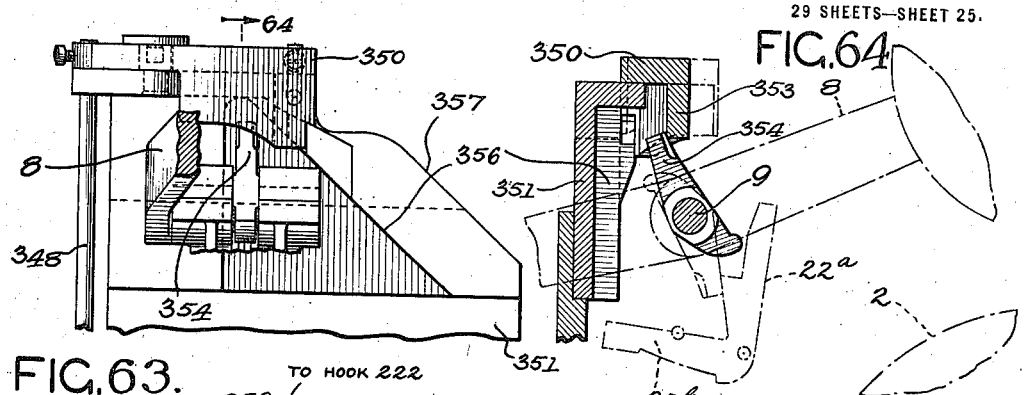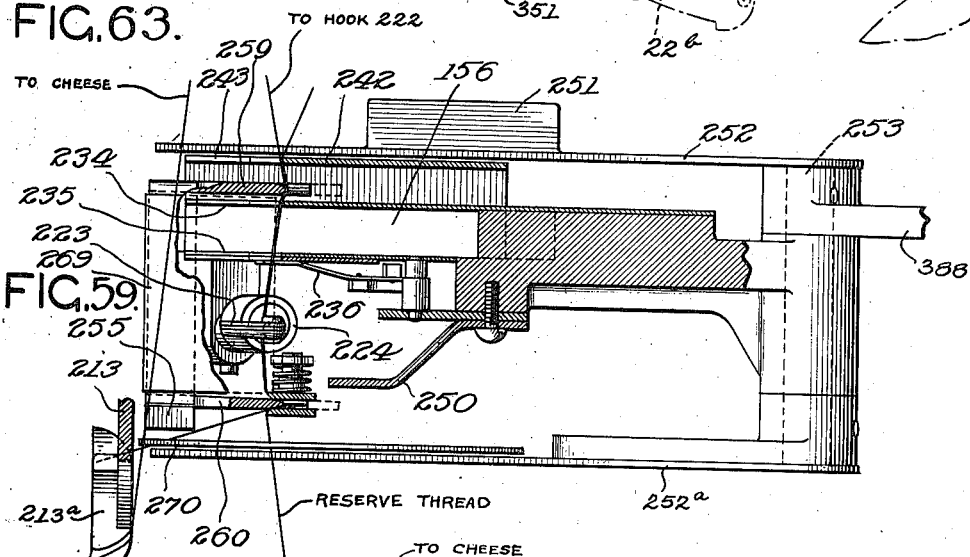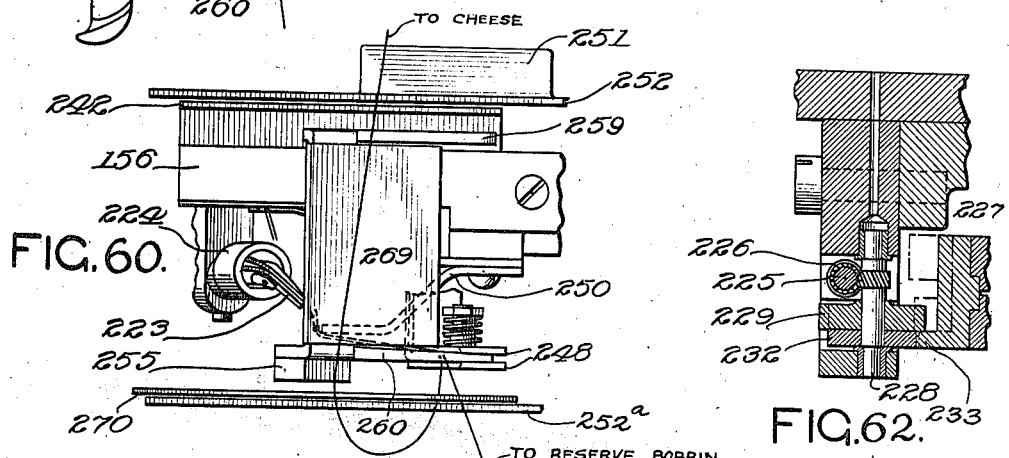

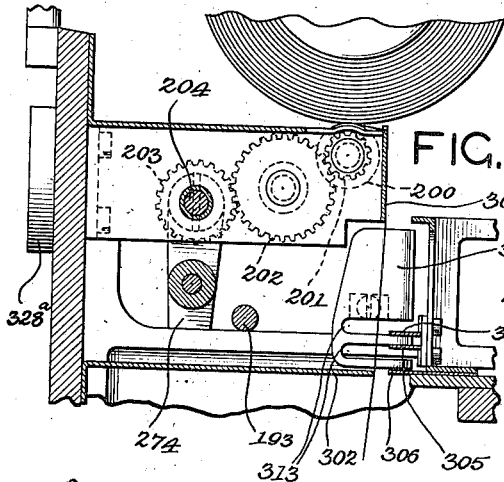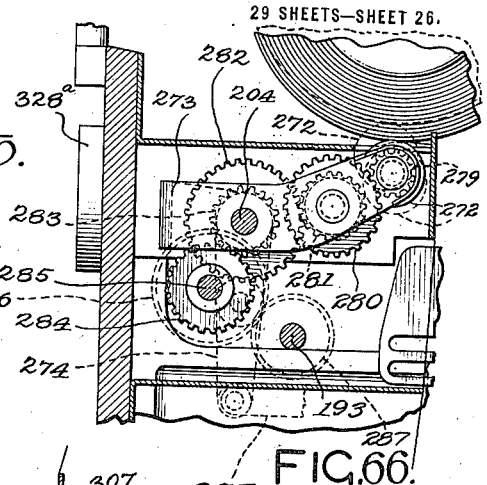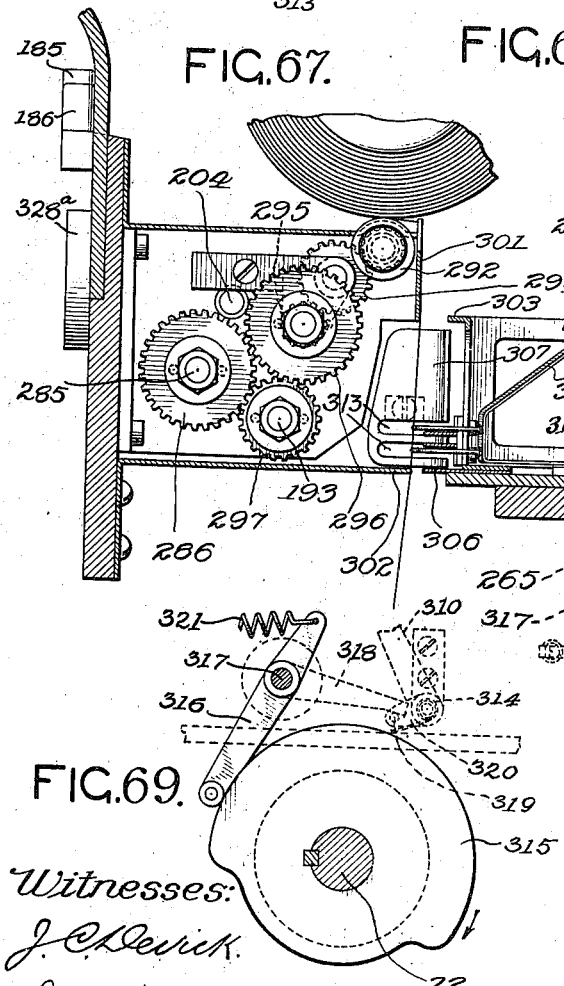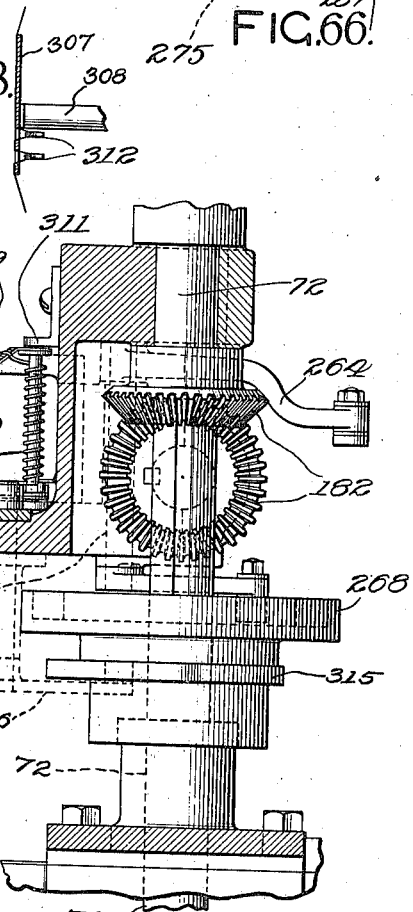

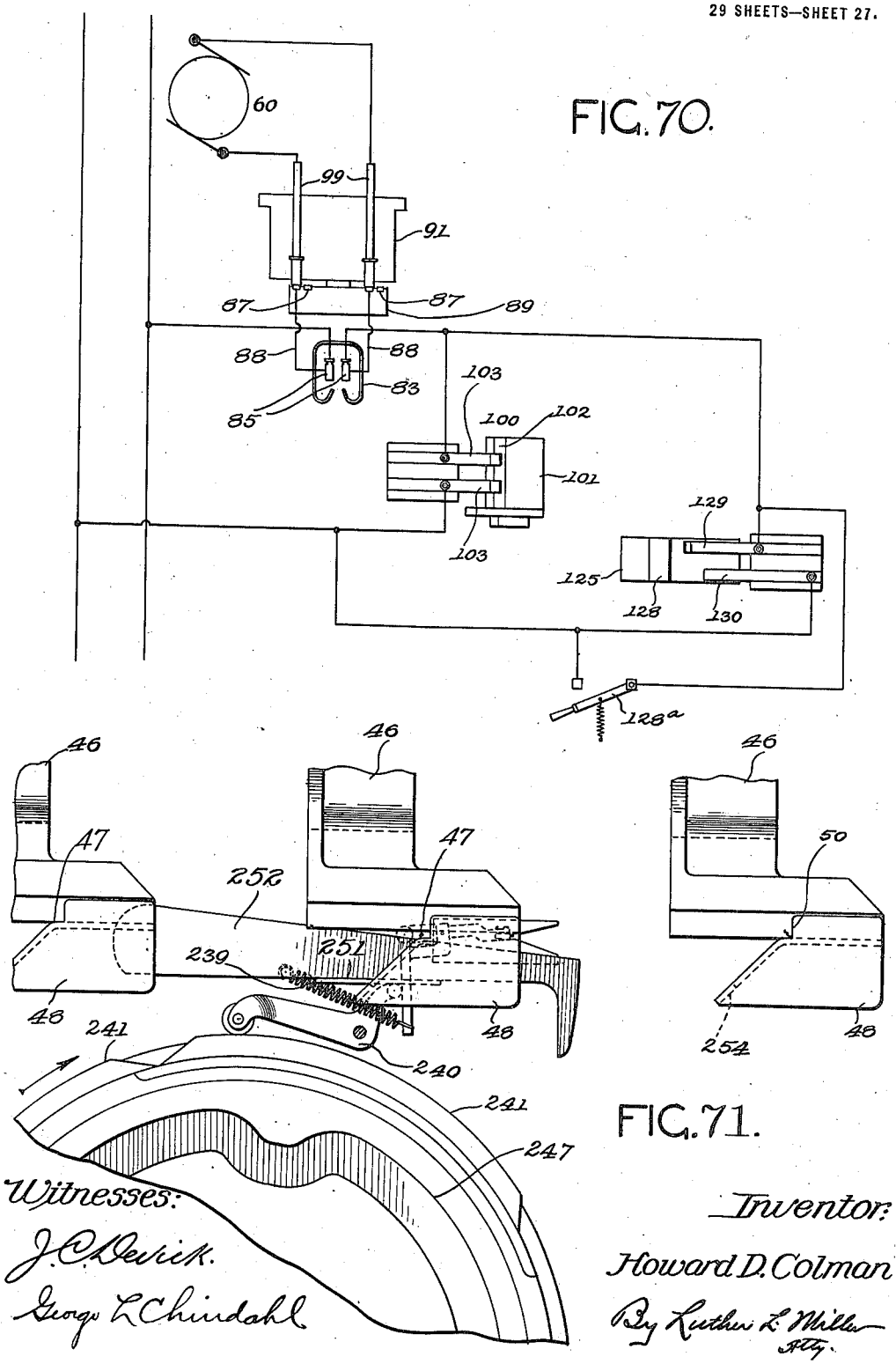

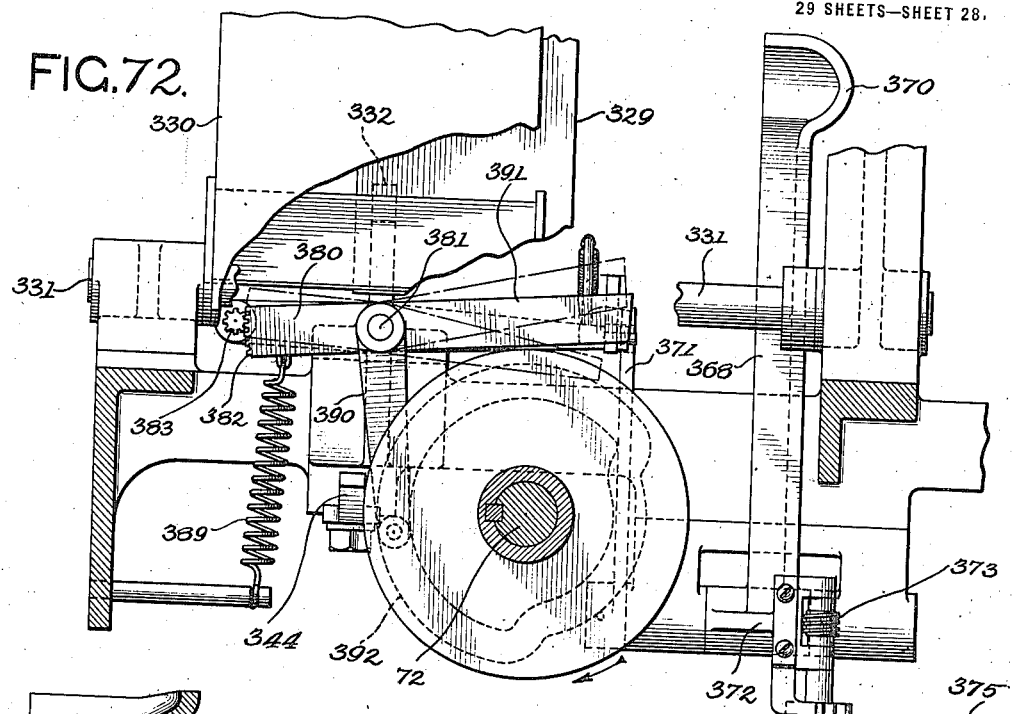
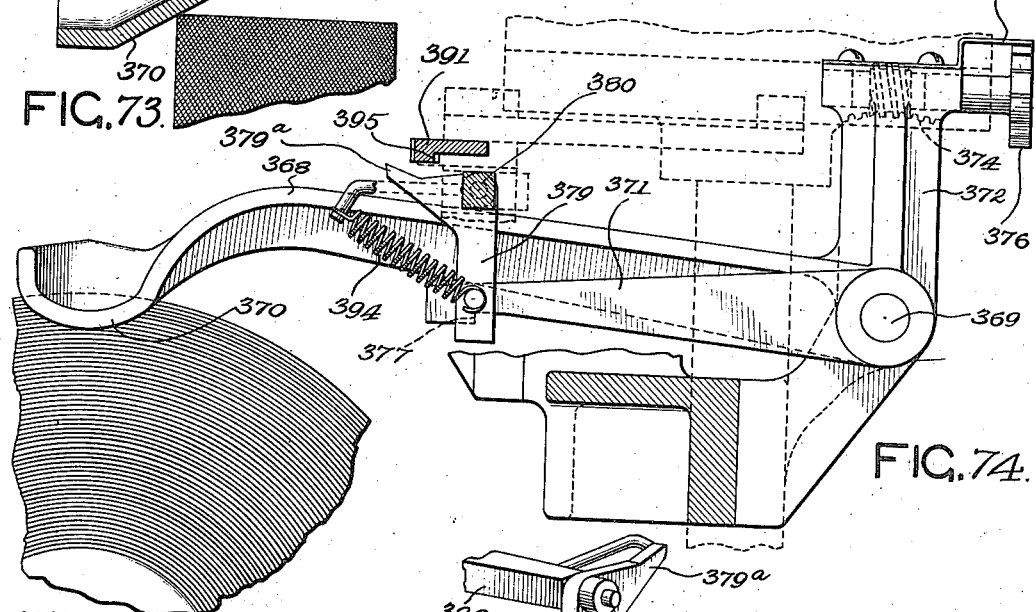
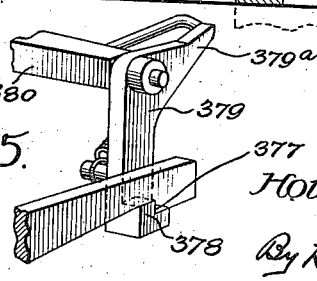

H. D. COLMAN.
WINDER.
APPLICATION FILED DEC. 31, 1913.
1,268,684.
Patented June 4, 1918.
29 SHEETS—SHEET 29.
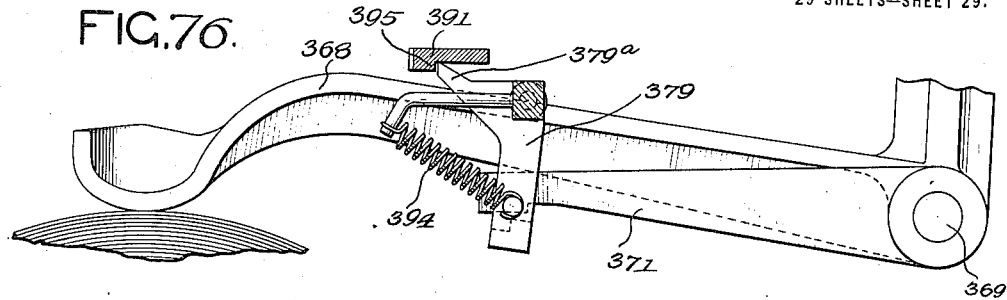
FIG. 76.
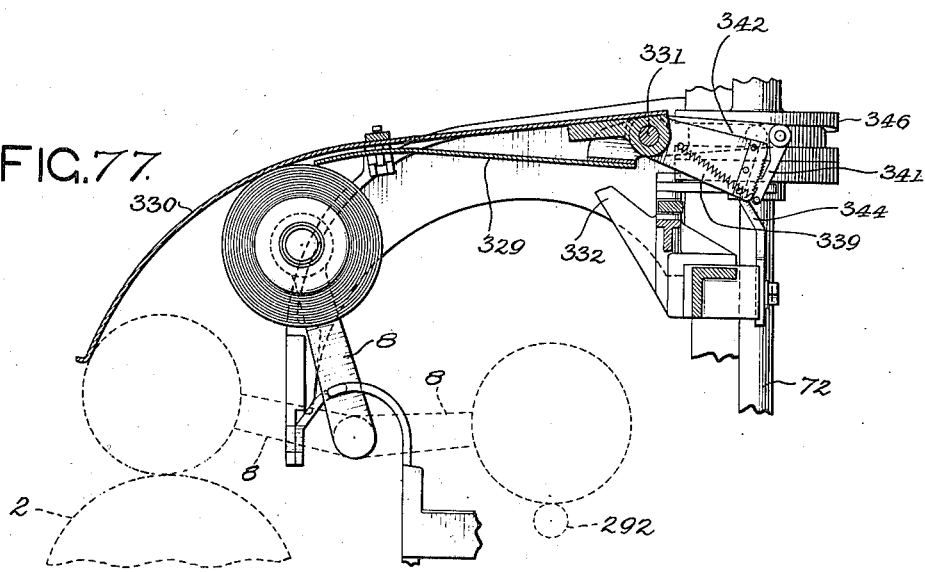
FIG. 77.
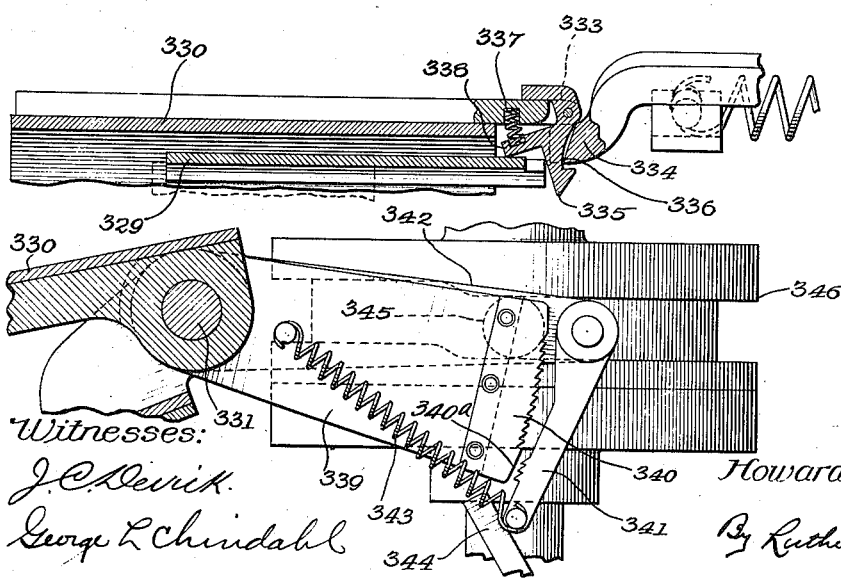
FIG. 78.
FIG. 79.
Witnesses:
J. C. Devrik.
George L. Chindahl.
Inventor:
Howard D. Colman
By Luther L. Miller
Atty.

UNITED STATES PATENT OFFICE.

HOWARD D. COLMAN, OF ROCKFORD, ILLINOIS, ASSIGNOR TO HOWARD D. COLMAN, LUTHER L. MILLER, AND HARRY A. SEVERSON, COPARTNERS TRADING AS BARBER-COLMAN COMPANY, OF ROCKFORD, ILLINOIS.

WINDER.

1,268,684.          Specification of Letters Patent.     Patented June 4, 1918.

Application filed December 31, 1913. Serial No. 809,797.

*To all whom it may concern:*

Be it known that I, HOWARD D. COLMAN, a citizen of the United States, residing at Rockford, in the county of Winnebago and State of Illinois, have invented certain new and useful Improvements in Winders, of which the following is a specification.

This invention relates to automatic winders, *i. e.*, to machines for winding yarn from bobbins onto spools, or onto cores to form cheeses, and provided with a winder-tending mechanism arranged to travel along the sides of the winder for joining the ends of the yarn on reserve bobbins to the ends of the yarn on the spools or cores.

In Patent No. 1,175,710 is shown an automatic winder of the type above referred to, each winder unit comprising means for automatically throwing the unit out of action when the running thread exhausts.

The present invention relates particularly, although not exclusively, to a traveling winder-tending mechanism adapted and arranged to operate upon winder units that have no automatic throw-out means.

The invention also refers to means for stripping the exhausted thread from the member that moves it to the knotter.

The invention also relates to the other improvements and advantages hereinafter set forth.

Figure 1:
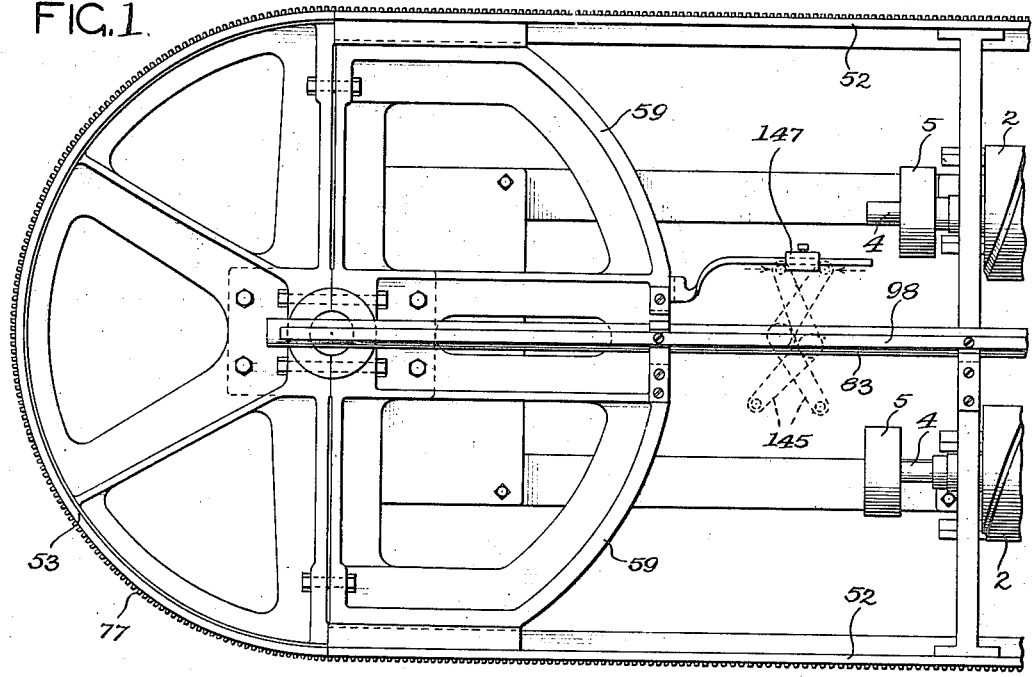
Figure 2:
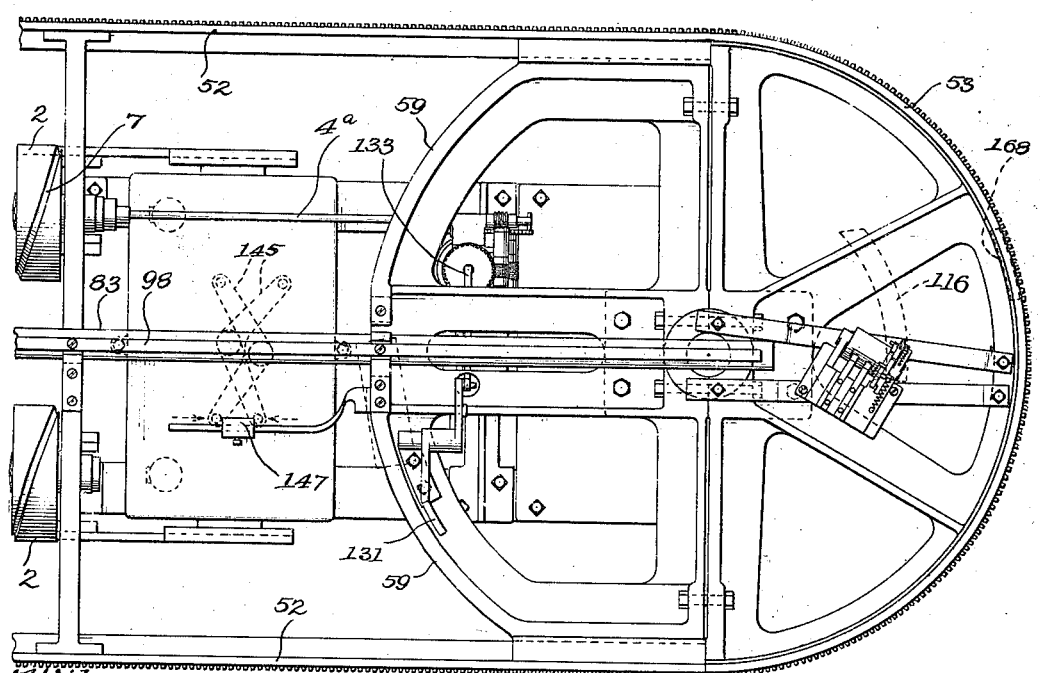
Figures 12, 13, 14, 15:
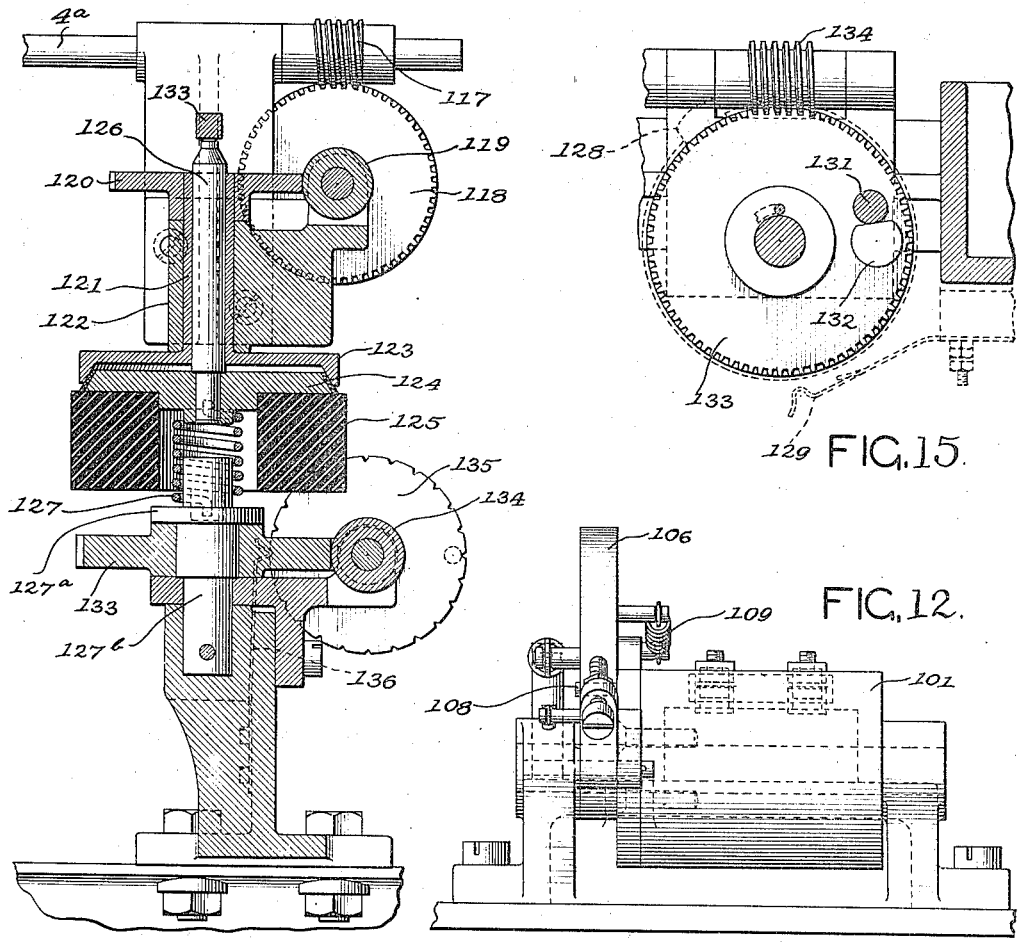
Figure 16:
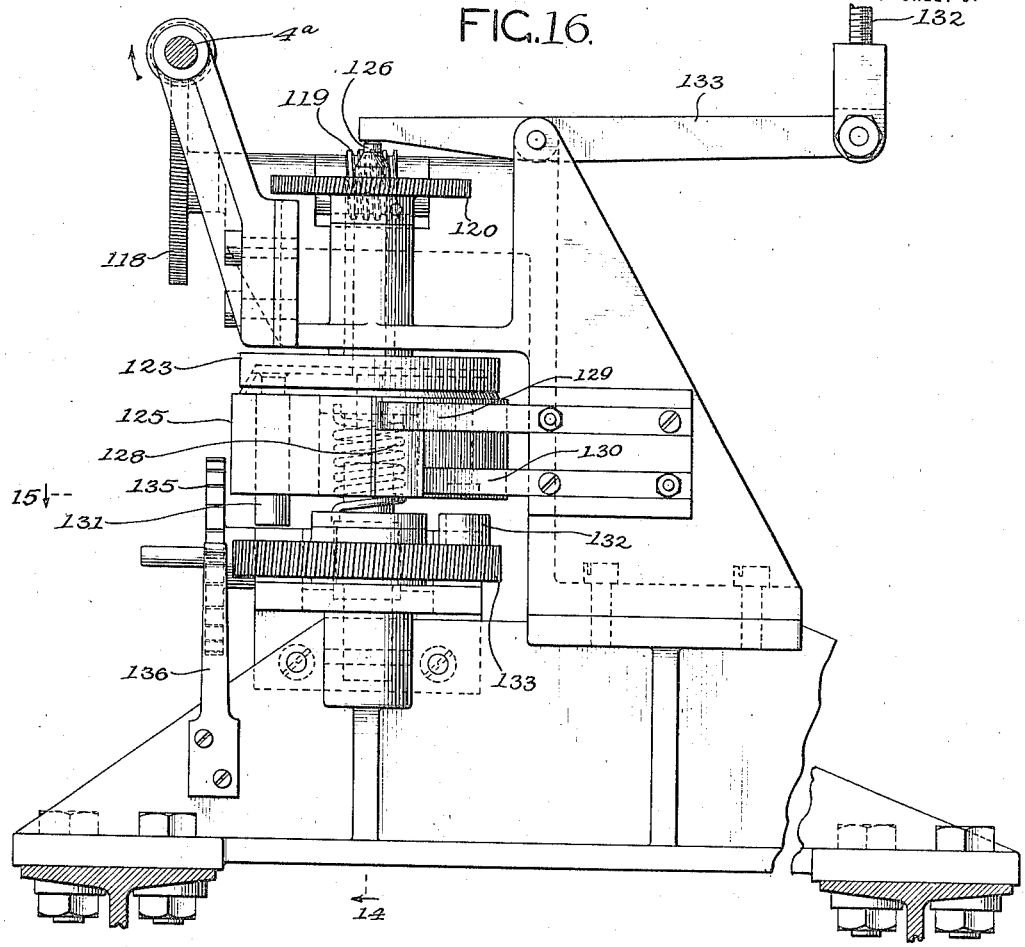
Figure 17:
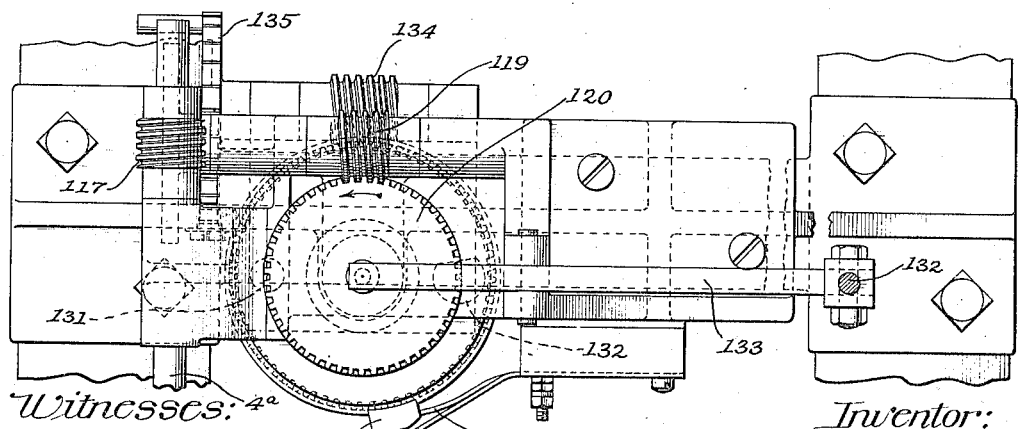
Figure 42:
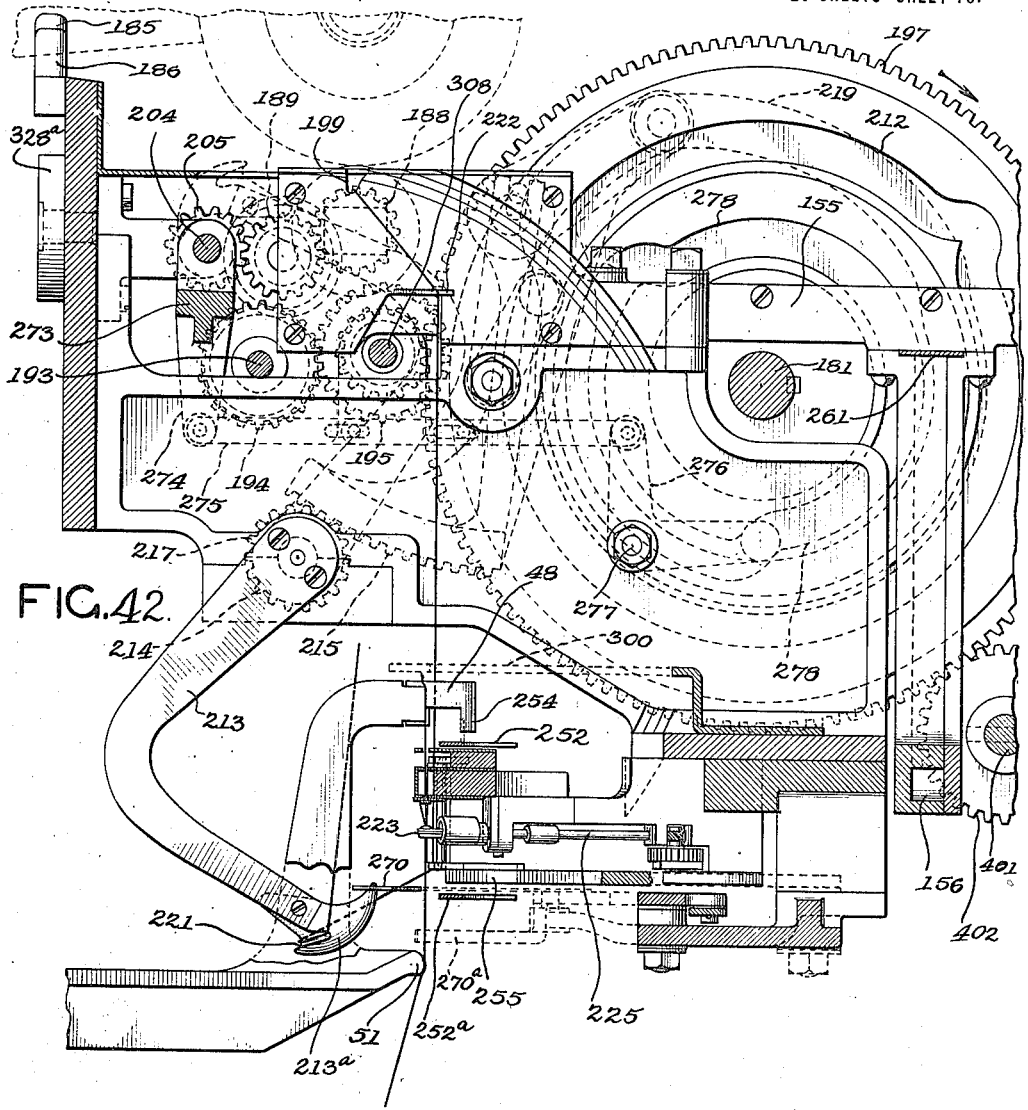
Figure 43:
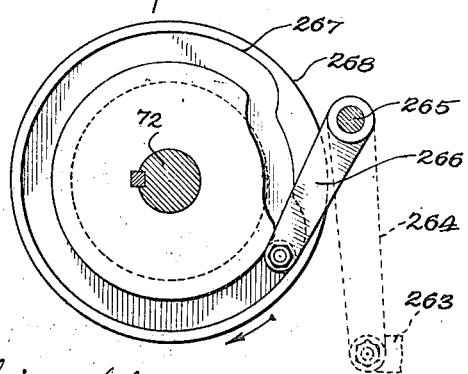
Figure 58:
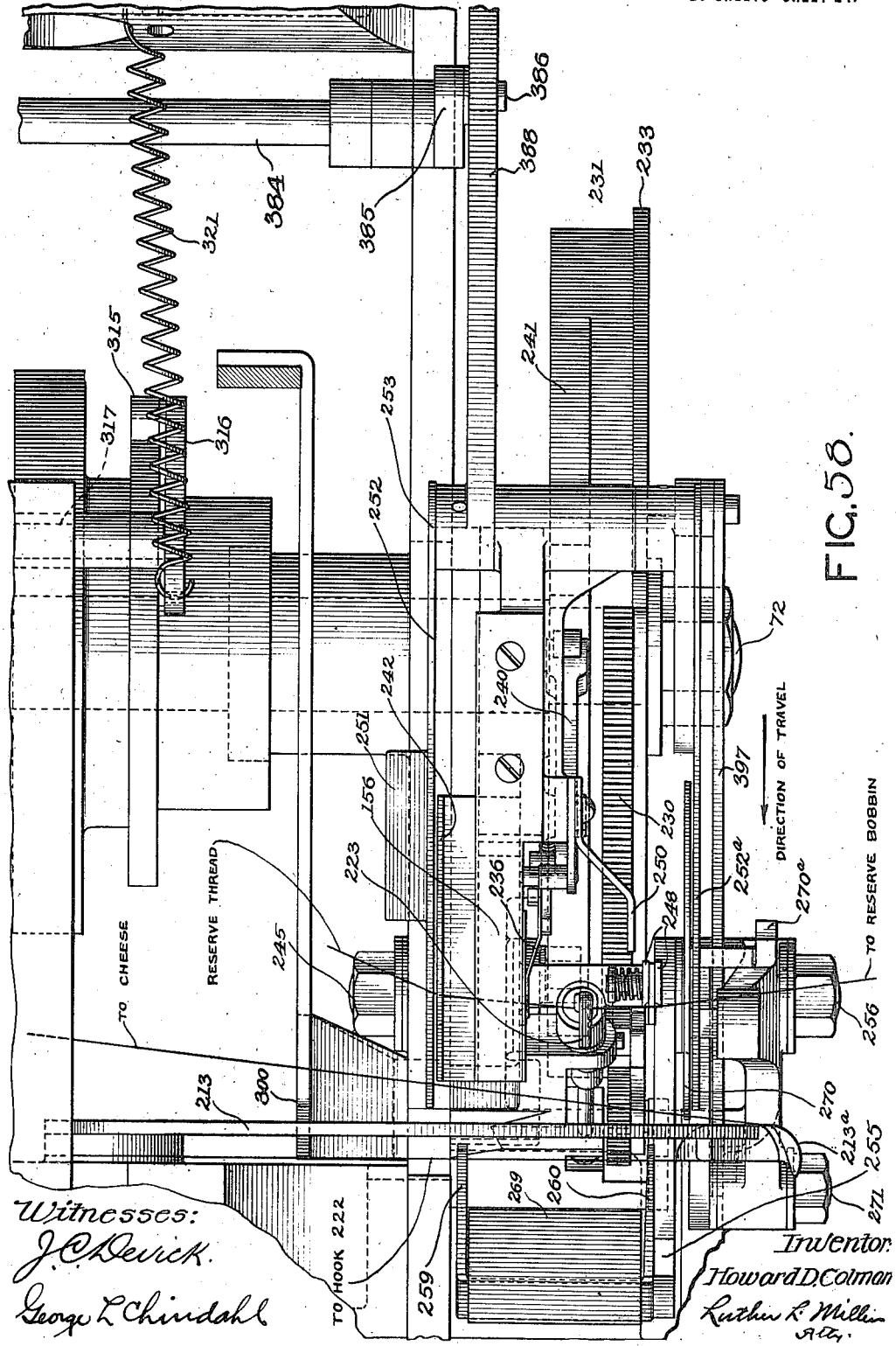

In the accompanying drawings, Figures 1 and 2 are plan views of the end portions of a winder embodying the features of my invention. Figs. 3 and 4 are fragmental side elevations of the opposite end portions of the winder. Figs. 5 to 11, inclusive illustrate means for conveying electrical energy to the motor that operates the winder-tending mechanism. Fig. 5 is a vertical section taken in the plane of dotted line 5 of Fig. 6. Fig. 6 is a view taken approximately in the plane of dotted line 6—6 of Fig. 10. Figs. 7 and 8 are vertical sections taken in the planes of dotted lines 7 and 8, respectively, of Fig. 6. Fig. 9 is a horizontal sectional view taken in the plane of dotted line 9—9 of Fig. 10. Figs. 12 and 13 illustrate a switch for opening the motor circuit after the winder-tending mechanism has completed a trip around the winder. Fig. 14 is a sectional view of a means for closing a shunt circuit around the switch illustrated in Figs. 12 and 13, Fig. 14 being a sectional view taken in the plane of dotted line 14 of Fig. 16. Fig. 15 is a view taken in the plane of dotted line 15 of Fig. 16, but showing the parts in a different position from that represented in Fig. 16. Fig. 16 is an elevation of the parts shown in Fig. 14. Fig. 17 is a top plan view of the parts shown in Fig. 16. Fig. 18 (Sheet 3) illustrates a means for operating the device shown in Figs. 14 to 17, inclusive. Fig. 19 is an end elevation of the winder. Fig. 20 is a fragmental sectional view of one of the bobbin holders, showing a cushioned back-stop for the bobbin. Fig. 21 is a fragmental side elevation of the winder, showing several of the winder units. Fig. 22 is a fragmental transverse sectional view of the winder illustrating one of the winder units and in dotted lines some of the parts of the winder-tending mechanism. Fig. 23 is a fragmental view of one of the winder units. Fig. 24 is a view of a guide or guard through which the yarn extends in passing from the bobbin to the cheese. Fig. 25 is an underside view of the lower end of said guide or guard. Fig. 26 is a horizontal sectional view illustrating a yarn-clearing means. Fig. 27 is a detail view of a portion of said clearing means. Fig. 28 is a sectional view of one of the reserve thread clamps, the view being taken in the plane of dotted line 28 of Fig. 29. Fig. 29 is a fragmental plan view of one of the winder units. Fig. 30 is a sectional view illustrating a means for rotatably supporting a cheese and for locking it in place on said supporting means. Fig. 31 is a view taken in the plane of dotted line 31—31 of Fig. 30. Fig. 32 is a plan view of the cheese supporting and locking means. Fig. 33 is a fragmental front elevation of the winder-tending mechanism. Fig. 34 is a fragmental right-hand end elevation of the winder-tending mechanism. Fig. 35 is a fragmental left-hand end elevation of the winder-tending mechanism. Fig. 36 is a side view of that portion of the winder-tending mechanism which travels upon the top of the winder. Fig. 37 is a plan view of the parts shown in Fig. 36. Fig. 38 is a horizontal sectional view taken approximately in the plane of dotted line 38 of Fig. 33. Fig. 39 is an enlarged detail view of certain parts shown at the left-hand side of Fig. 38. Fig. 40 is a vertical sectional view taken approximately in the plane of dotted line 40 of Fig. 38. Fig. 41 is a sectional view showing the means for insuring that the cheeses are properly positioned on their supports and for insuring that the yarn shall not slip off the periphery of the cheeses while the yarn is being acted upon by the winder-tending mechanism. Fig. 42 is a fragmental vertical sectional view of the winder-tending mechanism in the plane of dotted line 42 of Fig. 44. Fig. 43 is a view of a cam and connections for controlling the exhaust air current at the knot-tying mechanism. Fig. 44 is a fragmental plan view of the winder-tending mechanism. Fig. 45 is a vertical sectional view taken approximately in the plane of dotted line 45 of Fig. 44, certain parts being, however, omitted. Fig. 46 is a vertical sectional view through an air conduit comprised in the end-finding mechanism. Fig. 47 is a vertical sectional view of the end-finding mechanism, showing also the arm for carrying a bight of the exhausted thread to the knot-tying mechanism. Fig. 48 is a view on a smaller scale of the parts shown in Fig. 47, illustrating the operation of the shear. Fig. 49 is a view illustrating the operation of a shear which is associated with the end-finding mechanism. Fig. 50 is a vertical sectional view of the air conduit and the shear referred to, taken in the plane of dotted line 50 of Fig. 44. Fig. 51 is a section on line 51 of Fig. 46. Fig. 52 is a fragmental horizontal sectional view illustrating the devices immediately related to the knot-tying operation. Fig. 53 is a similar view, but showing the parts in a different position. Fig. 54 is a vertical sectional view taken in the plane of dotted line 54 of Fig. 53. Fig. 55 is an underside view of the parts shown in Fig. 52, the parts being shown in the same position in both views. Fig. 56 is a fragmental view illustrating the means for driving the knotter. Fig. 57 is an underside view illustrating a certain thread clamp and the means for operating the same. Fig. 58 is an elevation of the knot-tying mechanism and various related mechanisms, the view being taken from the rear side of the winder-tending mechanism. Fig. 59 is a fragmental view generally similar to that of Fig. 58, but showing the exhausted thread in operative relation to the knot-tying mechanism. Fig. 60 is a similar view, but showing the positions assumed upon the completion of the tying of the knot. Fig. 61 is a sectional view of a combined thread clamp and knot tightener and stripper comprised in the knot-tying mechanism. Fig. 62 is a view taken in the plane of dotted line 62 of Fig. 56. Fig. 63 is a fragmental view of a feeler-controlled means for throwing out a cheese. Fig. 64 is a view on line 64 of Fig. 63. Fig. 65 is a vertical sectional view taken in the plane of dotted line 65 of Fig. 44. Fig. 66 is a section on line 66 of Fig. 44. Fig. 67 is a section on line 67 of Fig. 44. Fig. 68 is a sectional detail view of the means for insuring that the yarn shall not slip off the periphery of the cheese and the means for taking up slack in the thread. Fig. 69 is a view of a cam and connections for operating said slack-take-up means. Fig. 70 is a diagram illustrating the circuits by means of which electricity is conveyed to the motor that drives the winder-tending mechanism. Fig. 71 is a fragmental plan view showing a means for opening the reserve thread clamps and a means for clamping the reserve thread prior to the operation of said clamp-opening means. Fig. 72 is a fragmental plan view of a means for detecting full cheeses, and a means for preventing the cheeses from unwinding while they are being placed in running position. Fig. 73 is a sectional detail of said detecting means. Fig. 74 is a side view of said detecting means. Fig. 75 is a perspective view of a portion of the detecting means. Fig. 76 is another side view of said detecting means. Fig. 77 illustrates the means for preventing the cheeses from unwinding while being transferred to the running position. Figs. 78 and 79 are fragmental views of said means.

The embodiment herein shown of the invention consists of mechanism for winding yarn from bobbins $a$ or $b$ onto cores $c$ to form cheeses $d$, and a mechanism arranged to travel along the winding mechanism and attach the ends of the yarn on the bobbins to the ends of the yarn on the cheeses, and perform various other operations attending the production of cheeses. (It may be here stated that the cheeses are not intended to be wholly unwound in the warper creel, the cores being returned to the winder from the creel with a small amount of yarn remaining thereon, so that there is always yarn on the cores to be united by the winder-tending mechanism to the thread ends on bobbins.) The winder consists of an elongated framework 1 providing two parallel sides, each side having means for rotatably supporting bobbins and means for supporting and rotating cheeses. The winder-tending mechanism travels around the winder and ties the end of the yarn on a reserve bobbin to every cheese, except in the case of cheeses that have reached the desired size.

The cheeses are rotated through peripheral contact with drums 2, each drum having a peripheral cam groove 3 in which the yarn runs to the cheese. In the rotation of the cam drum the groove 3 guides the yarn back and forth and thus builds up a cross-wound yarn mass on the core $c$. The cam drums 2 are fixed upon two shafts 4 (Figs. 1 and 19) extending longitudinally of the supporting frame, which shafts may be driven in any preferred manner, as, for example, by means of belts (not shown) running over pulleys 5 fixed on the shafts 4.

Fixed to the supporting frame adjacent to each cam drum is a bracket 6 (Figs. 19 and 21) having a bearing 7 at its upper end. A cheese-supporting arm 8 is pivotally mounted in the bearing 7 by means of a pivot 9 which is rigid with the lever. Upon the free end of the arm 8 is means for rotatably supporting a cheese, the means employed for this purpose in the present embodiment being illustrated in Figs. 30, 31 and 32. Upon a pivot or spindle 10 fixed to the arm 8 is rotatably mounted a hub 11. Ball bearings may be provided between the spindle and the hub, if desired. The core $c$ is adapted to fit upon the hub 11 and is releasably locked in position by a device comprising a locking slide 12 reciprocable within the hub 11. The slide 12 has a spring finger 13 arranged to project through a slot $12^a$ in the hub 11 and engage an annular internal shoulder 14 in the core $c$. A coiled spring 15 tends to hold the locking slide 12 in position to confine the core in proper place upon the hub. A lug 16 on the slide limits the movement of the locking member in one direction by engaging with the portion 17 of the hub 11.

When a cheese core is to be placed on the hub 11, the operative slips the core over the hub until the core stops against the annular stop flange $11^a$, the finger 13 yielding as the core is pushed on the hub, and springing out into locking position as soon as the shoulder 14 has passed the finger. When the cheese is to be removed, the operative draws the cheese off the hub 11, thereby bringing the spring finger 13 into engagement with the end wall 18 of the slot $12^a$, whereby said finger is pressed inwardly and thus disengaged from the shoulder 14.

The slot $12^a$ is of such length as to allow considerable lateral movement of the cheese under casual or incidental forces, without such movement resulting in disengagement of the cheese from the locking finger 13.

Means is provided for pressing the cheese against the cam drum and for correcting any tendency to the formation of an eccentric yarn mass on the tube, which means will next be described. A bell-crank lever 22 (Fig. 23) is pivoted at 23 to the bracket 6. The arm $22^a$ of said bell-crank is arranged to bear against a lug 24 fixed with relation to the pivot 9. A hanger 25 is suspended from the other arm $22^b$ of the bell-crank lever 22 and is connected by means of a coiled spring 26 to the arm $27^a$ of a lever 27 pivoted to the bracket 6. The other arm $27^b$ of the lever 27 bears against the surface $22^c$ of the lever arm $22^b$. The hanger 25 prevents lateral displacement of the lever arm $27^b$. Referring to Fig. 22: As the cheese increases in diameter, the upward swinging movement of the lug 24 causes the bell-crank lever 22 to tilt, the lever arm $27^b$ moving under the action of the spring 26 so as to remain in contact with the surface $22^c$ during such movement of the bell-crank lever 22, the arm $27^b$ thus serving to prevent movement of the bell-crank lever 22 in the opposite direction. It will be seen that the arm $22^a$ resists upward movement of the cheese, but does not cause downward movement of the cheese, since the arm $27^b$ is continually in position to prevent downward movement of the lever arm $22^b$. Thus, if for any reason there should be a tendency toward the production of an eccentric yarn mass on the core $c$, the high point of the yarn mass will receive the pressure of the spring 26, while the low point will be relieved of such pressure.

Associated with each cheese-supporting arm 8 and cam drum 2 is a pair of bobbin holders 28, said pair of bobbin holders being located below and in front of the cam drum. The bobbin holders may be of any suitable construction. Herein I have shown holders generally similar to that disclosed in Patent No. 1,045,879 dated Dec. 3, 1912, and comprising a loop or pocket $28^a$ of flexible material. Each of the present bobbin holders is provided with a cushioned back-stop consisting of a sheet metal plate 29 (Fig. 20) attached to the supporting structure by means of pins 30 riveted or otherwise attached to said plate and extending freely through openings 31 in said supporting structure. Cotter pins 32 or the like prevent withdrawal of the pins 30 from the openings 31. Surrounding each pin 30 and located between the plate 29 and the supporting structure is a washer 33 of felt or other suitable yielding material.

Between the pairs of bobbin holders are stationary partition plates 34.

Intermediate the active bobbin and the cam drum 2, the running thread extends through a guide or guard 35 stationarily mounted on the supporting frame. The form of the guard, which is best illustrated in Figs. 21, 22 and 23, corresponds to the shape of the path traversed by the thread. At its upper end, the interior width of the guard is approximately the same as the width of the periphery of the cheese, the guard tapering thence downwardly to the form indicated in Figs. 21 and 25. The forward side of the guard 35 is closed, save for an entrance slot 36. On the forward side of the guard and at its upper end are two inclined guides 37. When the cheese is moved from the position indicated in dotted lines in Fig. 22 to that represented in full lines in said figure, the guides 37 direct the thread into the slot 36. As shown in Fig. 19, the guard or guide 35 is directed downwardly in a plane which is substantially tangential to the bottom of the groove in the cam drum and which passes approximately through the middle portion of the bobbin. When the yarn is unwinding from the tip end of the bobbin, the yarn is prevented from leaving the guard 35 by reason of the fact that the lower end of the slot 36 is deflected slightly to one side (Figs. 21 and 25), so that one wall of the slot overhangs the patch of the thread.

Upon exhaustion of the thread, the guard 35 assists to prevent the cam drum from throwing the loose thread laterally off the periphery of the cheese. The guard 35 also serves the purpose of reducing the amount of flying lint or fiber.

At the lower end of the guard 35 is a snick plate 38 (Figs. 24 and 26) having a flaring throatway 39 and a slot 40 through which the thread runs, the walls of said slot having sharp edges, the inner end of said slot terminating in an enlargement 41. The plate 38 is removably supported in guideways 42. Below the snick plate is a plate 43 having an inclined guide edge 44 and a guide edge 45, the latter being so located with reference to the slot 40 that the thread is prevented from bearing against either of the walls of said slot 40. The walls of the slot 40 serve to clear the yarn of foreign matter, and to break down threads having gouts or bunches therein.

The end of the thread on the reserve bobbin is held in proper position to be operated upon by the winder-tending mechanism by the means shown in Figs. 21, 22 and 28. On a stationary bracket 46 is a thread clamp comprising a surface 47 (Fig. 71) and a member 48 yieldingly connected to the bracket 46 by the means shown in Fig. 28. On the movable member 48 is an inclined surface 49 which assists the operative in guiding the thread into the clamp. The edge 50 (Fig. 29) of the movable clamp member limits the extent to which the thread may be inserted into the clamp, and thus insures uniformity of the position of the thread-end. Below the thread clamp is a bridge 51 across which the thread extends, said bridge assisting to insure that the thread-end to be operated upon by the winder-tending mechanism shall occupy a definite position regardless of which bobbin holder contains the reserve bobbin and regardless of the point from which the thread leaves its bobbin.

Each pair of bobbin-holders and the associated cam drum, arm 8, thread-guide 35, snick plate 38 and reserve-thread holding means will hereinafter be termed a winder unit. The arms 8 are bent as indicated in Fig. 21 in order that the winder units may be placed as close together as possible.

In the present embodiment, the winder-tending mechanism is supported upon an endless rail located above the winder units and consisting of two parallel portions 52 extending along the winder framework, the ends of said rail portions being connected by semicircular rail-sections 53.

The framework of the winder-tending mechanism consists of the base or main section 54 (Figs. 36 and 37) and the depending frame 55 (Figs. 33 and 34) rigidly attached to one end of said base. The end of the base to which said depending framework is attached is provided with two rollers 56 (Fig. 33) arranged to run upon the upper edge of the rails 52 and 53; and adjacent to said rollers are guard rollers 57 (Fig. 34) that bear against the inner side of said rails, and two pinions 57ª and 57ᵇ which mesh with a rack (hereinafter described) that is arranged at the outer side of said rails. The opposite end of the base 54 is supported upon the rail portions 52 by means of a roller 58 (Fig. 36). When the winder-tending mechanism reaches one end of the winder, and the rollers 56 pass onto the semicircular rail-section 53 at that end of the winder, the base 54 turns through an arc of 180 degrees as the rollers 56 traverse said semicircular track section, the roller 58 moving on the curved rails 59 (Fig. 1) to the other side of the winder framework. It will be seen that the track-sections 53 and the rails 59 form a substantially circular track at each end of the winder.

Power to actuate the winder-tending mechanism and to cause said mechanism to travel about the winder framework is supplied by an electric motor 60 (Fig. 36) mounted upon that end of the base 54 which is carried by the roller 58. To the armature shaft of the motor is fixed a pulley 61 (Fig. 37) that drives a belt 62 which is arranged to run upon a tight and a loose pulley 63 and 64 mounted upon a shaft 65 carried by the base 54. Rigid with the drive pulley 63 is a stepped or cone pulley 66 which carries a belt 67 running to a cone pulley 68 fixed on one end of a shaft 69. To the other end of the shaft 69 is fixed a bevel pinion 70 (Fig. 33) that meshes with a bevel gear wheel 71 which is loosely mounted upon the upper end of a vertical shaft 72 carried in bearings upon the frame 55. Pivoted on the gear wheel 71 is a pawl 73 (Fig. 37) arranged to engage a ratchet wheel 74 which is fixed on the upper end of the vertical shaft 72. Said shaft has affixed thereto a pinion 75 (Fig. 33) that meshes with the pinion 57ª said pinion 57ª being mounted on a vertical pivot on the base 54. The pinion 57ª meshes with a rack 77 fixed in the framework of the winder and extending along the rail sections 52 and the semicircular rail sections 53. At the side opposite to the pinion 57ª is the similar idler pinion 57ᵇ. It will be seen that when the pulley 63 is driven by the motor, the winder-tending mechanism will be caused to travel along the winder framework. 78 (Fig. 37) is a belt shifter arranged to be operated by the hand lever 79 (Fig. 33) for stopping and starting the winder-tending mechanism.

Figure 10:
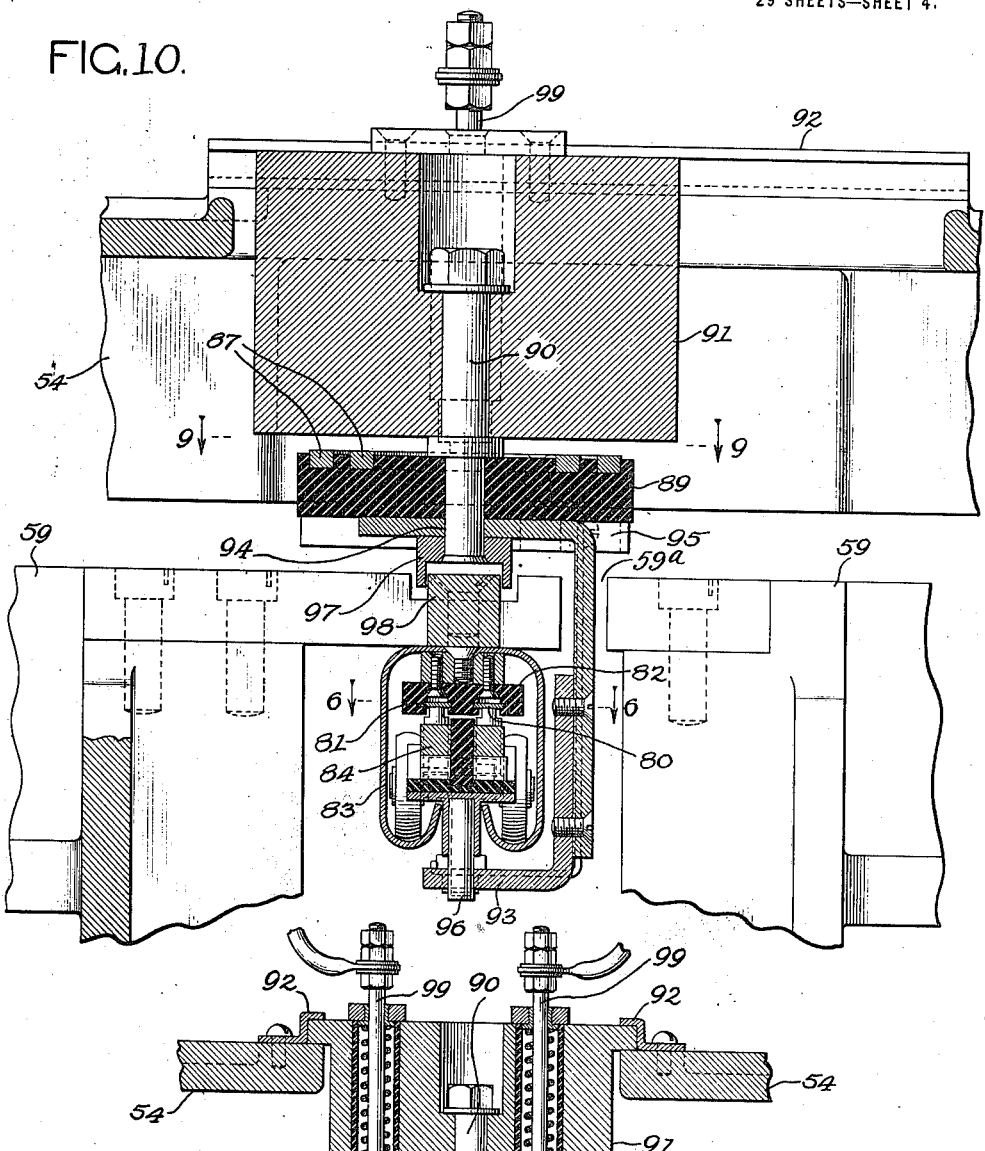
Figure 11:
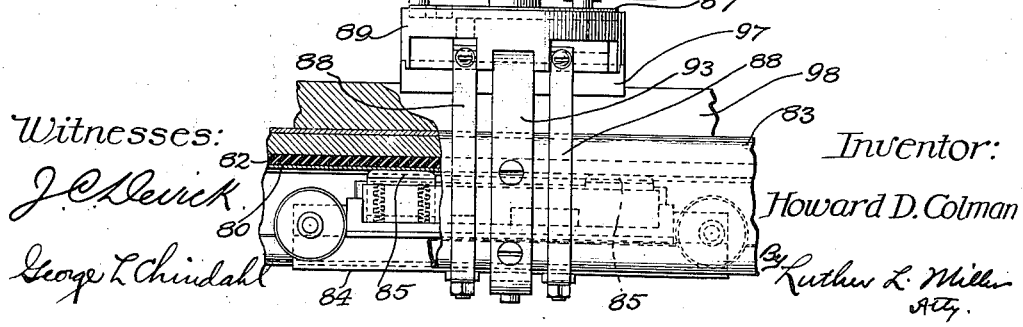

Electric current is conducted to the motor by means suited to the character of the current to be employed. Herein are shown two contact strips 80 and 81 (Fig. 10) secured in and extending longitudinally of a bar 82 of insulating material, said bar being fixed within a track 83 of the inclosed type. Said track is rigidly secured to and extends longitudinally of the winder framework in approximately the horizontal plane of the rail-sections 52 and 53. Within said track is mounted a trolley 84 carrying two pairs of spring-pressed contact shoes 85 (Fig. 6) each pair being electrically connected to a binding post 86. Each contact post 86 is connected to a contact ring 87 (Figs. 2 and 10) by means of a conductor 88. The contact rings 87 are let into a disk of insulating material 89. Said disk is fixed to a vertical spindle 90 which is rotatably connected to a slide 91 which is mounted in guides 92 upon the base 54. The trolley 84 is caused to travel with the winder-tending mechanism by means of a bracket 93 having an opening 94 through which the spindle 90 extends, a portion of said bracket lying within a groove 95 in the insulating disk 89, whereby relative rotation between the bracket and the disk is prevented. A pin 96 attached to the trolley extends loosely through an opening in the lower end of the bracket 93. As shown in Fig. 10, the rails 59 are interrupted at 59ª to permit the travel of the bracket 93.

The insulating disk 89 and the bracket 93 are prevented from turning as the winder-tending mechanism traverses the curves at the end of the winder framework by means of a guide shoe 97 (Fig. 10) fitting upon a guide rail 98 fixed in and extending longitudinally of the winder framework.

The slide 91 is provided with two binding posts 99 which are spring-pressed into contact with the contact rings 87. These binding posts are electrically connected with the motor 60. The base 54 is slidably connected to the parts that move upon the track 83 and the rail 98 so that the base 54 may adjust itself with reference to said parts as the winder-tending mechanism traverses the curves at the ends of the winder framework.

It is desirable that the winder-tending mechanism shall be ready to operate upon the successive units promptly after the bobbins exhaust. The time required to empty a bobbin varies with the amount of yarn thereon. It is therefore desirable that the travel of the winder-tending mechanism shall be subject to control, so that it may be varied when changes are made in the character of the yarn being wound. The winder-tending mechanism is therefore arranged to wait at one end of the winder framework after each round trip for a sufficient length of time to insure that the active bobbin of the next unit to be operated upon shall exhaust before the winder-tending mechanism reaches it. The length of the stoppage of the winder-tending mechanism is predetermined in accordance with the maximum length of time necessary to unwind bobbins containing a given size of yarn spun with a given amount of traverse and a given size of spinning ring.

The means of controlling the supply of current to the motor 60 in order to start and stop the winder-tending mechanism will next be described, reference being made particularly to the diagrammatic view, Fig. 70. Upon the completion of a round trip, the motor circuit is broken by means of a switch 100 comprising a cylinder 101 (Figs. 12 and 13) of insulating material, said cylinder being supported for oscillation. A contact plate 102 is let into the cylinder 101, said plate being arranged to bridge two contacts 103 which are included in the motor circuit. Attached to the cylinder 101 is a lug 104. Rotation of the cylinder 101 in one direction is limited by the engagement of the lug 104 with a fixed stop portion 105. Loosely mounted on the axis of the cylinder 101 is a trip arm 106 which is normally held by a spring 107 against a stop pin 108 fixed in the lug 104. It will be seen that said spring yieldingly holds the cylinder 101 in closed-circuit position. A tension spring 109 connects the trip arm 106 to the lug 104. A latch 110 pivoted at 111 is arranged to engage a locking shoulder 112 on the cylinder 101. Fixed to said latch is an arm 113 carrying a stop 114. A spring 115 tends to hold the latch 110 and the arm 113 in the position shown in Fig. 13.

Attached to the base 54 of the winder-tending mechanism is a cam 116 (Figs. 13 and 37) arranged to engage the trip arm 106 and move the latter into the position shown in dotted lines in Fig. 13. As the trip arm moves into such position it stretches the spring 109 and finally strikes and moves the stop 114, thus withdrawing the latch 110, whereupon the spring 109 immediately rotates the cylinder 101, thus withdrawing the plate 102 from the contacts 103. The winder-tending mechanism then stops.

When the predetermined idle period of the winder-tending mechanism has expired, a shunt is closed around the switch 100 by means to be now described. A shaft 4ª (Figs. 4 and 14) is fixed to one of the cam shafts 4 and carries a worm 117 that meshes with a worm wheel 118. The latter is fixed with relation to a worm 119 that meshes with a worm wheel 120 which is fixed to a sleeve 121. The sleeve 121 is rotatably mounted in a bearing 122 and carries at its lower end a friction clutch member 123. A coacting friction clutch member 124 is fixed to a disk or ring 125 of insulating material and is mounted upon a spindle 126 that extends slidably and rotatably through the sleeve 121. A compression and torsion spring 127 tends to hold the friction clutch members 123 and 124 in engagement with each other. One end of the spring 127 is attached to the clutch member 124, and the other end to a flange 127ª on a fixed pivot 127ᵇ. On the ring 125 is a contact block 128 (Fig. 17) which is arranged to engage a contact spring 129 and a contact finger 130 included in a shunt circuit around the switch 100. The finger 130 is arranged to serve as a stop to limit the movement of the ring 125 in the direction indicated by the arrow in Fig. 17, the friction clutch 123 124 slipping after the block 128 stops against the finger 130. When the block 128 engages the contacts 129 and 130, a circuit is closed around the switch 100 and current is supplied to the motor. The winder-tending mechanism thereupon begins to make another trip around the winder. As the roller 58 passes over one of the rail sections 59, it depresses one arm of a lever 131 (Figs. 4 and 18) the other arm of which lever is connected through a rod 132 to a lever 133 (Fig. 16), one end of the last mentioned lever overlying the upper end of the spindle 126. Said spindle is thereby depressed, thus separating the clutch member 124 from the clutch member 123. The spring 127 thereupon rotates the ring 125 in the direction contrary to that indicated by the arrow in Fig. 17 until a stop pin 131 fixed in said ring stops against a stud 132. The shunt circuit around the switch 100 is thereby opened. This occurs after the cam 116 has passed the trip arm 106 and the spring 107 has closed the switch 100. As soon as the roller 58 has passed the lever 131, the spring 127 moves the clutch member 124 into engagement with the clutch member 123, whereupon the ring 125 begins rotating in the direction indicated by the arrow in Fig. 17. The time occupied by the ring 125 in again closing the circuit at the contacts 129 and 130 depends upon the angular distance of the stud 132 from said contacts. In order that this distance may be conveniently altered when a change is made in the character of the yarn masses to be unwound, the stud 132 is mounted upon a worm wheel 133 rotatably mounted on the pivot 127ᵇ, said worm wheel meshing with a worm 134 which is rigid with a crank disk 135. It will be seen that by rotating the crank disk 135, the position of the stud 132 may be adjusted. A detent spring 136 engaging notches in the crank disk 135 holds said disk in adjusted position.

Fig. 70 illustrates a shunt circuit around the switch 128, 129, 130, said circuit containing a manually-operable switch 128ª. When the winder-tending mechanism is at a standstill at the end of the winder, the operative may, if he so desires, set said mechanism into operation by closing the switch 128ª, said switch being manually opened as soon as the cam 116 has passed the arm 106 (Fig. 13).

Exhaust air currents are employed for finding the thread ends upon the cheeses, for holding the threads at various points, and for carrying off waste portions of the threads. These currents may be produced by any suitable means, that herein shown being an exhauster 137 (Fig. 37) of ordinary construction, said exhauster being mounted upon the end of the base 54 which is opposite to the end that supports the motor 60. The exhauster 137 is provided with a tight and a loose pulley 138 and 139, respectively, and is driven by means of a belt 140 extending around said pulleys and a pulley 141 mounted on the motor shaft. Means is provided for shifting the belt 140 to the loose pulley after the suction devices have passed the last unit on a side, and for shifting the belt to the tight pulley just before the end-finder begins to operate upon the first unit on the other side. This means comprises a shifter lever 142 carrying pins 143 lying at opposite sides of the belt 140, said lever being fixed to a vertical rock shaft 144 carried by the base 54. To the lower end of said shaft is fixed a bell crank lever 145 carrying at its ends studs 146 arranged to engage stops 147 (Figs. 1 and 2) located near the ends of the winder framework. 148 and 149 (Fig. 37) are stops to limit the oscillatory movement of the bell crank lever 145. A coiled spring 150 acting upon an arm 151 fixed with relation to the rock shaft 144 tends to hold the bell crank lever 145 against one or the other of said stops. After the suction devices have passed the last unit on a given side, one of the studs 146 engages the stop 147 at that end of the winder whereby the bell crank lever 145 is caused to tilt until the point of connection of the spring 150 with the arm 151 has passed "over center", whereupon said spring swings the shifter lever 142 to shift the belt to the loose pulley. After the winder-tending mechanism has traversed the semicircular track, and just before the end-finder reaches the first unit on the other side, the other stud 148 engages said stop 147 and causes the belt to be shifted to the tight pulley.

To separate the waste thread-ends from the air current, there is provided a centrifugal separator 152 (Fig. 35) secured to the framework 55 and connected to the exhauster by means of a tube 153. The air current enters the separator chamber 152 tangentially through a tube 154 which has two branches 155 and 156 (Fig. 46) extending to the end-finder and the knotter, respectively. The rotation of the air in the chamber 52 causes the thread-ends to be thrown outwardly to the walls of said chamber, whence they fall to the bottom of the chamber, the air passing out through the tube 153.

In each round trip of the winder-tending mechanism, the separator 152 is automatically opened to discharge the accumulation of thread clippings. For this purpose the bottom 157 (Fig. 33) of the separator is loosely pivoted to an arm 158 which is fixed upon a shaft 159. Fixed on the shaft 159 is a pinion 160 that meshes with a segment 161 pivoted to the framework 55. Said segment is connected by means of a link 162 to an arm 163 fixed upon a shaft 164. To the shaft 164 is fixed a crank 165 carrying a pin 166 (Fig. 34). A spring 167 normally holds the bottom 157 closed and holds the pin 166 in the horizontal plane of a cam block 168 (Figs. 2 and 4) attached to the lower side of the rack bar 77 at one end of the winder framework. During the travel of the winder-tending mechanism around that end of the winder the pin 166 strikes the cam block 168, whereby the bottom 157 is caused to swing downwardly, the contents of the separator falling into a suitable receptacle (not shown). The spring 167 closes the bottom 157 as soon as the pin 166 has left the cam block 168. While the exhauster is running, atmospheric pressure holds the bottom 157 tightly against the lower end of the body of the separator.

When approached by the winder-tending mechanism, the majority of cheeses will be running on the cam drums, the remainder being in the throw-out position indicated in Fig. 23. As shown in the plan view, Fig. 38, and the side view Fig. 40, two plows 169 and 170 are fixed to the framework 55 in position to pass at opposite sides of the series of brackets 6. The plow 169 comprises an inclined surface 171 arranged to raise an arm 8 that is in the operative position, and throw said arm onto the inclined surface 172 of the plow 170, said surface 172 serving to let the arm 8 settle gently onto the surface 173 of the plow 170. The plow 170 has an inclined surface 174 arranged to raise a thrown-out arm 8 and guide such arm onto the inclined surface 172.

When placing a cheese core on a hub 11, the operative may neglect to push the core far enough onto the hub to allow the latch finger 13 to lock the core in place. In order to insure that the cheeses are properly mounted upon the hubs 11, and thus insure that the cheeses shall register properly with the parts of the traveling mechanism that operate on the cheeses, I provide a cheese-seating device comprising a spring finger 175 (Fig. 34) fixed to a slide 176 (Fig. 38), the latter being mounted upon a guide bar 177 extending parallel with the direction of movement of the winder-tending mechanism. When the cheese-supporting arm 8 has been placed on the surface 173, the slide 176 is given a forward and back movement, to press the finger 175 against the end of the core $c$ and withdraw the finger therefrom, by means of a cam 178 operating upon a lever 179 which is pivoted at 180 (Fig. 34), said lever having a pin and slot connection with the slide 176. The cam 178 is fixed upon a horizontal shaft 181 carried in the supporting frame 55, said shaft being driven through bevel gearing 182 (Fig. 33) from the vertical shaft 72. The pressure of the finger 175 against the core $c$ is sufficient to insure that the core is in contact with the stop flange 11$^a$ and that the spring finger 13 is in locking engagement with the annular shoulder 14. The pressure of the finger 175 against the end of the core $c$ also serves to stop the rotation of the cheese, if the latter be still rotating through momentum.

As the winder-tending mechanism progresses, an inclined cam surface 183 (Fig. 40) on the plow 170 raises the arm 8 sufficiently so that the cheese is clear of the finger 175. After the dwell 184 has passed under the arm 8 the arm descends the incline 185 and thereafter the incline 186, thus placing the cheese on the end-finding device. Said device comprises a roll 187 (Fig. 44) on which the cheese rests and whereby the cheese is revolved in the direction required to unwind yarn from the cheese. This roll is driven by means of a pinion 188 rigid with said roll and meshing with a pinion 189. The pinion 189 is fixed upon a shaft 190 (Fig. 34) that carries a pinion 191 that meshes with a pinion 192. The pinion 192 is fixed upon a shaft 193 that carries a pinion 194 (Fig. 42) that meshes with a pinion 195 (Fig. 41). Rigid with the pinion 195 is a pinion 196 that meshes with a spur gear wheel 197 (Figs. 38 and 42) fixed on the shaft 181.

At the rear end of the roller 187 is located the suction opening or mouth 198 of the air duct 155. As the winder-tending mechanism progresses, said suction opening arrives under the cheese and as the latter is revolved by the roll 187 the free end of the yarn on the cheese is drawn into the suction opening. In the rear wall of the air duct 155, adjacent to the suction opening 198, is a notch 199 into which the thread is drawn as the suction opening moves out from under the cheese (see Fig. 47). Before the roller 187 has passed completely out from under the cheese, another roller 200 passes under the cheese. The rollers 187 and 200 revolve at the same surface speed, and their upper sides are in the same horizontal plane. The roller 200 is driven by means of the gear train 201, 202 and 203 (Fig. 65), the gear 203 being fixed upon a shaft 204 (Fig. 44) which also carries a pinion 205 meshing with the pinion 189.

In order to increase the friction between the cheese and two rollers 272 and 292 to be hereinafter described, the cheese is pressed against said rollers through the action of an arm 200ª (Figs. 38 and 40) which is pivoted at 200ᵇ in the framework of the winder-tending mechanism, said arm being pressed against the arm 8 that carries the cheese by a spring 200ᶜ acting upon an arm 200ᵈ which is rigid with the arm 200ª. If it be desirable also to increase the friction between the cheese and the roller 200, the arm 200ª may (as herein shown) be arranged to engage the arm 8 early enough to effect this result.

It sometimes happens that a loose coil of yarn on the periphery of the cheese is drawn into the suction tube together with the free end of the yarn, the coil being pulled laterally off the periphery of the cheese as the mechanism progresses. In order to free the cheese from such a displaced coil or strand, I provide a shearing mechanism comprising a shear blade 206 (Figs. 44 and 46) fixed to a slide 207 and arranged to coact with a stationary shear blade 208 (Fig. 49). The shear blade 206 is arranged to reciprocate across the mouth 198 to shear a strand or strands extending from the core c or the hub portion 19 to the mouth 198. The slide 207 is reciprocated by means of an arm 209 (Fig. 45) pivoted at 210, said arm being rigid with an arm 211 carrying a roller stud that lies within a cam groove 212 (Fig. 42) formed in a disk or ring which is attached to the spur gear wheel 197. The shear 206 208 serves to shear all strands except the one leading from the periphery of the cheese, the severed pieces being drawn into the suction tube.

It sometimes happens that the exhausted thread upon the cheese is caught under a piece of leaf or is otherwise held to the periphery of the cheese at a point some little distance from the end of the thread. In such a case, when the end of the thread has been picked off the periphery of the cheese by the exhaust air current, and the held point has passed the suction opening 198, the continuing rotation of the cheese tends to draw the thread out of the suction tube and rewind it on the cheese. In order to increase the resistance to withdrawal of the thread from the suction tube, the latter may, if desired, be made tortuous, as shown in Fig. 46. When drawn into the air duct, the thread will bear against the walls of the duct at the angles thereof, whereby the resistance to withdrawal is increased.

The pressure of the thread against the walls of the duct also counteracts the tendency of the air current to untwist the thread.

The means for carrying the exhausted thread to the knot-tying mechanism comprises an arm 213 (Fig. 42) fixed to one end of a rock-shaft 214 (Fig. 45), said shaft being oscillated by means of a segment 215 pivoted at 216 and meshing with a pinion 217 fixed on said shaft. Rigid with the segment 215 is an arm 218 carrying a roller stud that lies within a cam groove 219 (Fig. 42) formed in one side of the spur gear wheel 197. The arm 213 is arranged to operate in a space provided between the rear side of the air duct 155 and a guard plate 220 (Fig. 47). To the free end of the arm 213 is fixed a head 213ª having a notch 221 therein to engage the portion of the thread extending from the notch 199, over the upper edge of the guard plate 220, to the cheese.

As the down-take arm 213 swings downwardly it carries a bight of the exhausted thread to the knot-tying mechanism, slack being furnished by the unwinding of the cheese due to the rotation of a roll 272 (Fig. 44). The peripheral speed of said roll is such that the cheese furnishes all of the thread for the loop or bight produced in the downward movement of the down-take arm, no thread being drawn from the air duct 155. The roller 272 is supported in a bracket 273 (Fig. 66), said bracket being mounted for swinging movement upon the shaft 204. Fixed to the bracket 273 is an arm 274 which is connected by means of a link 275 to a bell crank 276 (Fig. 42) pivoted to the framework at 277. Said bell crank has a roller stud that lies in a cam groove 278 formed in a ring fixed to the side of the spur gear wheel 197.

The roller 272 is rotated by means of the gear train 279, 280, 281, 282, 283, the gears 282 and 283 being loose on the shaft 204, and the gear 283 being driven by the gear 284, the gear 284 being fixed on the short shaft 285. Fixed to the shaft 285 is a gear wheel 286 (Fig. 67) that meshes with the gear wheel 287 (Fig. 45) fixed on the shaft 193.

The roller 272 rotates more rapidly than the roller 200. In order that the cheese shall be rapidly accelerated by the roller 272, the latter is mounted, as described, in a pivoted bracket so that the roller 272 may be raised to lift the cheese off the roller 200. The cheese is thus lifted off the roller 200 by the cam 278 just before the down-take arm 213 descends. As the down-take arm swings downwardly it carries one strand of the bight over a stationary hook 222 (Figs. 42 and 44).

The knot-tying mechanism is so located on the framework 55 as to be carried along in a horizontal plane lying between the series of reserve thread clamps 48 and the series of bridges 51. The knot-tying mechanism comprises a rotary tying bill 223 (Fig. 42) which may be of any suitable form and construction. It is herein shown as substantially similar to that fully described in Patent No. 959,592 dated May 31, 1910. The movable jaw of the tying bill is actuated by a cam barrel 224 as in said patent. The tying bill 223 is secured to a shaft 225 which carries a spiral pinion 226 (Fig. 62) that meshes with a spiral pinion 227 on a shaft 228. Fixed on the shaft 228 is a pinion 229 (Fig. 56) arranged to mesh with a segmental rack 230 fixed to a drum 231, said drum being fixed to the lower end of the vertical shaft 72. The gear elements 229 and 230 are so proportioned as to rotate the tying bill 223 through two revolutions in each revolution of the drum 231. While the pinion 229 is out of mesh with the rack 230, the tying bill is locked against rotation by means of a stop member 232 fixed to the shaft 228 and adapted to slide in contact with a locking flange 233 on the drum 231.

The knot-tying mechanism further comprises a plurality of thread guides and devices for controlling the threads during the tying operation. Among said devices is the exhaust air duct 156, the mouth of said duct being located above the tying bill. In the upper and lower walls of said duct are formed flaring throatways 234 235 (Fig. 59) for the reception of the threads to be united. A spring clamping member 236 attached to a bell crank 237 (Fig. 57) pivoted at 238 is adapted to clamp the threads between itself and the lower side of the lower wall of the air duct. The bell crank 237 is oscillated by means of a spring 239 and a bell crank 240, the latter being operated by means of a cam flange 241 on the drum 231.

Above the inlet end of the air duct 156 is a fixed plate 242 having a flaring throatway or notch 243 which is vertically alined with the throatways 234 and 235.

Below the tying bill is a combination thread clamp and knot tightener and stripper comprising an arm 244 (Fig. 61) which is pivoted at 245 (Fig. 53) and provided with a roller stud 246 which runs in a cam groove 247 in the drum 231. The arm 244 carries two clamping fingers 248 which are yieldingly held in the position indicated in Fig. 61 by a spring 249. 250 (Fig. 60) is a fixed bracket which coöperates with the clamp arm 244 in the stripping operation, as will appear more fully hereinafter.

As the winder-tending mechanism progresses, the thread guide 242, the suction tube 156, the tying bill 223 and the thread-clamping fingers 248 are carried against the reserve thread, as shown in Fig. 58. As soon as the reserve thread has reached the inner end of the throatway 235 it is clamped therein by the spring clamping finger 236 which swings across the inner end of the throatway. A moment after the reserve thread is thus clamped in the throatway 235 it is released from the clamp 48 through the action of a projection 251 (Figs. 58 and 71) mounted on an arm 252 which is pivoted at 253 in the framework of the winder-tending mechanism. As the winder-tending mechanism travels, the projection 251 is moved against an inclined lug 254 on the movable clamp member 48, whereby said clamp member is moved to the position shown in Fig. 71, thus releasing the end of the reserve thread. One strand of the bight of the exhausted thread which is drawn down by the down-take arm 213 is placed in operative relation to the knot-tying mechanism by an arm 255 (Fig. 55) which is pivoted at 256, said arm having a roller stud 257 that travels in a cam groove 258 in the drum 231. Fixed to the free end of the arm 255 are two notched fingers 259 and 260. Fig. 52 shows the position occupied by the arm 255 as the down-take arm 213 completes its downward movement. As the down-take arm swings downwardly it carries against the fingers 259 260 the strand of the exhausted thread which extends to the hook 222. The arm 255 then swings toward the knot-tying mechanism, thereby carrying the exhausted thread into the throatways 243, 234 and 235, and laying the exhausted thread against the tying bill and inserting said thread between the clamping fingers 248.

A moment after the passing-in arm 255 has acted, the spring clamping finger 236 is moved aside to allow the exhausted thread to pass into the inner end of the throatway 235, said clamping finger being immediately returned into clamping position so as yieldingly to hold both of the threads in position for the tying operation. As the exhausted thread is placed in position at the knotter, an exhaust air current is inaugurated in the suction tube 156 by reason of the opening of a valve 261 (Figs. 46 and 51) therein. This valve is located near the juncture of the branches 155 and 156 and has a port 262 arranged to establish communication between the conduit 154 and the branch 156. The valve 261 is connected by means of a link 263 to an arm 264 (Figs. 33 and 67) which is fixed to the upper end of a shaft 265. To the lower end of the shaft 265 is attached an arm 266 having a roller stud that runs in a cam groove 267 (Fig. 43) in a cam disk 268. Said cam disk is fixed on the shaft 72. As soon as the reserve and exhausted threads have been positioned at the tying mechanism, the tying bill 223 is rotated to tie the knot. The slack required in the formation of the loops of the knot is provided through slippage of the threads past the spring clamping finger 236, the slack in the reserve thread coming from the suction tube 156 and the slack in the exhausted thread coming from the suction tube 155. The spring clamping finger 236 is swung aside after the loops of the knot have been formed, the threads thereafter being held in the throatway 235 by the suction current. After the loops of the knot have been formed, the threads are clamped and sheared in the tying bill, and the loops are pulled off the tying bill and over the ends clamped in said bill by a simultaneous movement of the arms 244 and 255 (see Fig. 60). In this movement the threads are carried against the end of the stationary finger 250, the continued movement of the arms 244 and 255 finally causing the ends of the knotted threads to be pulled out of the tying bill. The movement just referred to is imparted to the arms 244 and 255 by the cam grooves 247 and 258. The arm 255 is then restored to its normal position, ready to receive the next exhausted thread, such withdrawal of the arm 255 causing the united ends to be released from the clamping fingers 248. The trimmed-off end of the reserve thread is drawn into the suction tube 156, while the waste end of the exhausted thread is carried away by the suction current in the air tube 155. The valve 261 is closed after the tying of the knot is completed. 269 is a guard plate fixed to the end of the passing-in arm 255. When the passing-in arm is in the position shown in Fig. 59, the plate 269 is between the tying bill and the strand leading to the cheese, thereby insuring that the suction shall not draw said strand against the tying bill and cause the thread to be broken.

As will be apparent from Figs. 42 and 59, the action of the passing-in arm 255 causes the exhausted thread to be looped over the head 213ª of the down-take arm 213. To prevent the exhausted thread from clinging to the head 213ª when the down-take arm rises to its thread-receiving position, I provide a stripper 270, the point of which lies adjacent to the path of movement of the head 213ª, as shown in Fig. 52. When the down-take arm rises, the point of the stripper 270 intervenes between the head 213ª and the strand that leads to the cheese, thereby preventing said strand from clinging to and being carried up with said head.

It may be here stated that the down-take arm rises while the passing-in arm is in the position indicated in Fig. 59.

The stripper 270 is pivoted at 271, but has no pivotal movement except when the winder-tending mechanism meets with a complete cheese, as will be more fully explained hereinafter.

At about the time when the tying bill begins to form the knot, the bracket 273 is tilted to lower the cheese onto a slack-take-up roller 292 (Figs. 38 and 44).

The slack taking-up roller 292 is rotated in the direction opposite to the direction of the rotation of the rollers 187, 200 and 272 by means of the gear train 293 (Fig. 44), 294 (Fig. 67), 295, 296 and 297, the gear wheel 297 being fixed upon the shaft 193.

By the time the knot has been tied and stripped, the slack-take-up roller has caused the cheese to reverse its direction of rotation, whereupon the cheese begins to revolve in the direction to take up slack in the united threads.

The bight of the exhausted thread was moved by the arm 213 down through a space 298 (Fig. 38), one side of which is defined by a plate 299 (Fig. 44) and a bracket 300 (Fig. 52), both fixed in the framework of the traveling mechanism. As the winder-tending mechanism progresses, the strand extending from the hook on the down-take arm to the cheese passes through a narrow space extending parallel with the direction of movement of the winder-tending mechanism, one side of which space is defined by a guard plate 301 (Fig. 67) and a guide plate 302, and the other side of which is defined by flanges 303, 304, 305 and 306. The guard plate 301 may, if desired, be provided with a number of teeth 301ª (Fig. 45) in its upper edge, these teeth insuring that the thread shall not slip off the periphery of the cheese while the thread is reciprocating across the periphery in furnishing slack to the down-take arm. The friction of the plates 301 and 302 and the pull of the arm 213 is prevented from dragging the thread off the periphery of the cheese, as the winder-tending mechanism advances, by means of a thread-pushing device consisting of a plate 307 (Figs. 45 and 65) attached to a rod 308 (Fig. 41), said rod being mounted for reciprocating movement in a bearing 309 and being attached to the slide 176. It will be remembered that the slide 176 carries the cheese-seating finger 175 and is reciprocated on the guide 177 by the cam 178. When the down-take arm 113 descends, the rod 308 and the plate 307 are so far forward as to be out of the path of movement of said down-take arm. After the down-take arm has carried down a bight of the exhausted thread, the rod 308 is moved rearwardly to keep the plate 307 in such relation to the cheese as to guard against the possibility of the strand slipping over the edge of the cheese and onto the tube. During the slack-taking-up rotation of the cheese, the plate 307 keeps the thread near the center of the periphery of the cheese.
It is desirable to keep the exhausted thread substantially taut at all times in order that it shall be under control, and further, so that the thread shall not have an opportunity to kink, and so that if kinks are formed the thread shall be straightened out before the kinks can be wound upon the cheese. I, therefore, provide means which acts to take up slack in the exhausted thread during the period between the time when the exhausted thread is clamped between the fingers 248 (Fig. 59) and the time when the roller 292 becomes effective to take up slack. This means comprises a bracket or arm 310 (Figs. 44 and 67) pivoted at 311 and carrying a fork consisting of two curved fingers 312 which are arranged to bear against the strand extending between the hook of the down-take arm and the cheese. The plate 307 is slotted as indicated at 313 in Fig. 65 to allow the fingers 312 to pass therethrough and bear against a strand extending across said plate. A torsion spring 314 (Fig. 67) presses the fingers 312 against the thread a moment after the thread has been clamped by the fingers 248. The flanges 304, 305 and 306 insure that the thread shall not be displaced to one side of the plate 307. After the slack in the united threads has been taken up by the roller 292 and the cheese is about to be lifted off said roller, the fingers 312 are swung away from the thread by a cam 315 (Figs. 33, 67 and 69) which operates on an arm 316 fixed to the lower end of a shaft 317. To the upper end of the shaft 317 is fixed an arm 318 arranged to engage a stud 319 on a crank 320 fixed to the bracket 310. A spring 321 holds the arm 316 in operative relation to the cam 315.
The exhausted thread having been tied to a reserve thread, and the slack in the united threads having been taken out, the cheese is ready to be placed on its cam drum 2. This is accomplished by means of a cam surface 322 (Fig. 38) of the plow 170, which cam surface throws the arm 8 upward over center, whereupon the arm falls onto the inclined cam surface 323 on the plow 169. The cam 323 controls the descent of the cheese onto the cam drum.

It may be here stated that in the travel of the winder-tending mechanism the reserve thread was pulled along the front edge of the bridge 51 by the knot-tying mecha- nism until said thread came to the space between said bridge and the next adjacent bridge. The reserve thread then passed into the space between said bridges, and when the slack in the united threads was taken up by the rotation of the cheese when driven by the roller 292, and the cheese was transferred to the cam drum 2, the thread passed through the space 324 (Fig. 29) and the space 325 (Fig. 38) and was guided by the parts 44, 48 and 37 into the guard 35 and the snick plate 38. 327 is a guard extending upwardly from the plane of the parts 302 and 306 to a point above the series of brackets 6. The guard 327 insures that the thread shall not foul on the bearing 7 as the cheese is being transferred to the cam drum.

$270^a$ is a finger fixed to the stripper 270 and normally lying in position to push the reserve thread off the bridge 51 in case the thread has not entered the space between the two adjacent bridges by reason of the travel of the knot-tying mechanism as above described. See Figs. 42 and 54.

It will be remembered that when the plow 169 raised the arm 8 as the winder-tending mechanism approached the unit, the lug 24 tilted the bell-crank 22, the bell-crank being retained in such position by the arm $27^b$. In order to move the bell-crank so that the arm $22^a$ shall offer no resistance to the return movement of the arm 8, and in order that the pressure of the spring 26 shall not be applied to the cheese until the latter has been accelerated, there is mounted on the framework of the winder-tending mechanism a roller $328^a$ (Fig. 40) arranged to pass under the arm $22^b$ and thus raise said arm, thereby moving the arm $22^b$ out of the path of the lug 24. The arm $22^a$ is retained in this position by the arm $27^b$.

While the cheese is being transferred from the slack-take-up roller 292 to the cam drum 2, the drag of the bobbin would cause the cheese to revolve upon its pivot in the direction to unwind yarn if means were not provided to prevent such rotation. By reference to Fig. 22 it will also be apparent that after the cheese has passed a certain point in its travel from the slack-take-up roller 292 to the cam drum 2 the distance between the cheese and the bobbin will be decreasing. In order to prevent the thread from becoming slack while the cheese is being transferred from the slack-take-up roller to the cam drum, I provide means comprising two plates 329 and 330 (Figs. 35, 77 and 78) pivotally mounted upon a pivot 331 fixed to the frame 55. The plate 329 is arranged below the plate 330 and is touched and raised by the cheese as the latter is being elevated by the cam surface 322. 332 is a stop for limiting downward movement of the plate 329, which limit is so arranged that the cheese shall come into contact with said plate as soon as practicable after the cheese leaves the slack-take-up roller 292.

Downward movement of the plate 330 is limited by engagement of a portion 333 (Fig. 78) on said plate with a stop 334 fixed to the framework 55. The plate 330 is prevented from bounding or vibrating while the winder-tending mechanism is passing around the ends of the winder, by means of a latch 335 attached to said plate and arranged to engage the portion 336 of the stop 334. A spring 337 tends to hold the latch in locking position. As the plate 329 is swung upwardly by the cheese, said plate engages a finger 338 fixed to the latch 335 and disengages said latch from the locking portion 336. In the continuing upward movement of the plate 329, said plate raises the plate 330. As the cheese swings out from under the plate 329, it rolls into contact with the plate 330. The friction between the cheese and the plates 329 and 330 is sufficient to cause the cheese to revolve in the direction to wind up yarn and thus prevent the yarn from becoming slack.

The reason for providing two plates 329 and 330 is to cause the cheese to come into contact with the slack-preventing means promptly after the cheese leaves the slack-take-up roller 292. As shown in the drawings, the lower plate 329 is shorter than the upper plate 330, and when in its lowermost position is considerably closer to the axis of the cheese-supporting levers 8 than the plate 330. Thus the cheese comes into contact with the plate 329 very soon after the cheese is lifted off the slack-take-up roller 292, even in the case of a cheese of small diameter.

The plate 330 is arranged to remain in contact with the cheese until after the latter has touched the cam drum. Means is provided for lifting the plate off the cheese soon after the cheese touches the cam drum, which means will now be described.

Rigid with the plate 330 is an arm 339 (Fig. 79) having a ratchet-toothed locking plate 340 attached thereto. The teeth of said locking plate are arranged to be engaged by a dog 341, said dog being pivoted to an arm 342 which is loosely mounted on the pivot 331. A spring 343 tends to move the dog 341 into engagement with the plate 340. 344 is an inclined tripping projection fixed in the framework and arranged to be engaged by the end of the dog 341 for disengaging said dog from the toothed plate 340. The arm 342 has a roller stud 345 which runs in a grooved cam 346, said cam being fixed upon the shaft 72.

In its rotation, the cam 346 raises the dog 341 and immediately lowers said dog, the dog in its descent lifting the plate 330 off the cheese. Such lifting of the plate is timed to occur a moment after the cheese touches the cam drum, assuming the cheese to be of the smallest diameter. A dwell portion of the cam then causes the dog to pause, after which the dog is lowered until it strikes the trip 344, whereupon the dog is disengaged from the plate 340 and the plate 330 drops until it strikes the plate 329 or until the stop 333 (Fig. 78) strikes the stop 334.

The provision of a plurality of teeth in the plate 340 enables the dog 341 to lift the plate 330 just enough to be clear of the cheese, notwithstanding the fact that the plate 330 assumes different positions in accordance with variations in the diameters of the cheeses.

When the winder-tending mechanism is traveling around the ends of the winder, the teeth of the plate 340 are up out of reach of the dog 341, the dog sliding idly on the smooth surface $340^a$ (Fig. 79) of said plate.

The winder-tending mechanism comprises means for ascertaining, before the winder-tending mechanism leaves a given unit, whether the unit is winding a thread, and for throwing out the cheese if the new thread has broken or if the mechanism has failed to tie a reserve thread to the exhausted thread. This means comprises a feeler finger 347 (Figs. 33, 35, 38 and 40) fixed to the lower end of a vertical rock-shaft 348. The feeler finger 347 is located in a horizontal plane lying between the plates 43 and the snick plates 38. Fixed to the upper end of the rock-shaft 348 is a detent 349 arranged to engage one arm of a bell-crank 350 which is pivoted to a bracket 351 fixed to the framework 55. A torsion spring 352 (Fig. 40) tends to hold the feeler finger in position to touch the new thread as the winder-tending mechanism progresses.

On one arm of the bell-crank 350 is a flange 353 (Fig. 64) which is arranged to engage a lug 354 fixed to the pivot 9 of the arm 8. A spring 355 tends to hold the bell-crank 350 in the position shown in Fig. 38, in which position the flange 353 is at an angle to the direction of travel of the winder-tending mechanism. If a thread be running through the space between plates 38 and 43, the feeler finger 347 will be swung into the position shown in dotted lines in Fig. 38, whereby the detent 349 will be held out of engagement with the bell-crank 350. The lug 354 will then cause the flange 353 to swing aside against the tension of the spring 355. If there be no thread in the space between the plates 38 and 43, the torsion spring 352 will swing the feeler finger 347 into the position shown in full lines in Fig. 38, thereby placing the detent 349 in engagement with the bell-crank 350 and locking the latter against pivotal movement. When the inclined flange 353 meets the lug 354 it will force said lug forward, thereby raising the arm 8. There is a beveled surface 356 (Fig. 63) on the bracket 351 which in effect is a continuation of the flange 353. As the winder-tending mechanism progresses, the lug 354 is guided by the flange 353 onto the beveled surface 356. As soon as the arm 8 has been raised over center it drops onto an inclined surface 357 on the bracket 351, said inclined surface acting to control the descent of the arm and the cheese. After the surface 357 has moved out from under the arm 8, the arm drops until the lug 354 stops against the surface 22$^d$ of the bell-crank 22 (See Fig. 23). The spring 26 yields as the lug 354 strikes the surface 22$^d$ and thus cushions the stoppage of the arm 8. The arm remains in the thrown-out position until the winder-tending mechanism reaches it in the course of the next round trip.

After the reserve thread has been tied to the exhausted thread and winding at normal speed resumed, the bell-crank 22 should be released in order that it may act to press the cheese against the cam drum. For this purpose there is mounted upon the framework of the winder-tending mechanism a roller 358 (Figs. 22, 33, 35 and 40) which passes under the arm 22$^b$ and lifts said arm sufficiently to remove the surface 22$^c$ from the arm 27$^b$. A moment thereafter another roller 359 passes over the arm 27$^a$ and depresses said arm, thereby swinging the arm 27$^b$ outwardly. The roller 358 passes out from under the arm 22$^b$ before the roller 359 leaves the arm 27$^a$. As soon as the roller 358 leaves the arm 22$^b$ the spring 26 tilts the bell-crank 22, thereby bringing the arm 22$^a$ against the lug 24. The roller 359 then leaves the arm 27$^a$, whereupon the arm 27$^b$ springs into contact with the surface 22$^c$. The means for pressing the cheese against the cam drum and for preventing eccentricity of the yarn mass are then in the normal running condition, as in Fig. 22.

The winder-tending mechanism also comprises means for clearing the yarn clearers 38 of gouts or other matter that may have clogged the clearers. This means, in the present embodiment, comprises a spring plate 360 (Figs. 22 and 34) attached to the lower end of a lever 361 pivoted at 362 to the frame of the winder-tending mechanism. The lever 361 is arranged to be swung by means of a lever 363 pivoted to the frame at 364 and provided with a roller stud that runs in a cam 365 fixed to the shaft 181. In the lever 363 is a cam slot 366 through which extends a roller stud fixed to the lever 361. As the cam revolves, the lever 361 is oscillated to cause the edge 367 of the spring plate 360 to scrape the under side of the plate 38 and push the matter which has accumulated along the edges of the slot 40, rearwardly out of the path of the thread, the accumulated matter dropping onto the plate 43. The clearer-cleaning device operates just before the end-finding roller 187 reaches the unit.

Means is provided for detecting the fact that a cheese has reached the desired diameter and for preventing the reserve thread from being tied to such a cheese. The detecting means comprises a feeler or gage arm 368 (Figs. 35, 72, 74 and 76). Said arm is loose on a shaft 369 which is mounted in the framework 55. The end 370 of the feeler 368 lies in the vertical plane occupied by thrown-out cheeses. The arm 368 is adjustably connected to an arm 371 which is fixed on the shaft 369. The adjustable connection comprises an arm 372 rigid with the feeler 368 and carrying a worm 373 that meshes with a segment 374 fixed to the shaft 369. 375 is a locking spring engaging a notched hand wheel 376 which is rigid with the worm 373. It will be seen that the worm and segment constitute a rigid connection between the feeler 368 and the arm 371. By turning the hand wheel 376, the normal position of the feeler 368 may be adjusted to correspond with the size of cheese desired. The arm 371 has a shoulder 377 which is arranged to lie behind a projection 378 on a bell crank 379 which is pivoted to one end of a lever 380. The lever 380 is loosely mounted on a pivot 381. In the other end of the lever 380 are formed gear teeth 382 that mesh with a pinion 383 fixed to the upper end of a shaft 384 (Figs. 33, 38, 52 and 58). To the lower end of said shaft is fixed a crank arm 385 provided with a crank pin 386 that lies in an elongated opening 387 in an arm 388 which is fixed to the pivot 253. To the opposite ends of said pivot 253 are fixed the arms 252 and 252$^a$. These arms extend beyond the forward end of the thread guide 242, the suction tube 156, the tying bill 223 and the clamping fingers 248. A spring 389 (Fig. 72) normally holds the arms 252 and 252$^a$ and the lever 380 in the position shown in Figs. 52, 55, and 72.

A bell crank 390 and 391 (Fig. 72) is loosely mounted on the pivot 381. The arm 390 carries a roller stud that lies in the groove 392 of a cam 393 (Fig. 33) fixed upon the shaft 72. When the feeler 368 rides over a full cheese, the arm 371 is lifted, thereby disengaging the shoulder 377 from the projection 378, whereupon a spring 394 swings the bell crank 379 and places the arm 379$^a$ of said bell crank in the path of a shoulder 395 on the bell crank arm 391. Upon the next forward swing of the arm 391, the shoulder 395 strikes the arm 379$^a$ and turns the lever 380, thereby turning the shaft 384 and swinging the arms 252 and 252$^a$ into the position shown in Fig. 53. This movement of the arms 252 and 252$^a$ occurs just as the free ends of said arms arrive alongside the reserve thread. The reserve thread is thus pushed aside out of the path of the knot-tying mechanism (see Figs. 53 and 54). When the cam 393 moves the arm 391 rearwardly, the spring 389 restores the arms 252 and 252$^a$, the shaft 253 and the lever 380 to the normal position. The feeler 368 having in the meantime passed the full cheese, the shoulder 377 is in position to engage the projection 378 and thus disengage the arm 379$^a$ from the shoulder 395.

When the reserve thread is deflected rearwardly out of the path of the knot-tying mechanism by the arms 252, 252$^a$, as just described, the lug 251 which is mounted on the arm 252 passes clear of the lug 254 on the reserve-thread clamp 48 so that the reserve-thread clamp is not opened.

The stripper 270 and the finger 270$^a$ are moved out of the way of the reserve thread at the same time that the arms 252 and 252$^a$ are moved against said thread. The stripper 270 is pivoted at 271 and is rigid with a crank 396 which is connected by means of a link 397 to an arm 398 fixed to the pivot 253.

It will thus be seen that when a full cheese is met with, the reserve-thread clamp is not opened, the reserve thread is deflected out of the path of the knotter, and the stripper 270 and the finger 270$^a$ are moved aside so as to pass the reserve thread. The latter therefore remains in position to be tied to a cheese core on the next round trip.

After the reserve thread has been pushed out of the path of the tying mechanism, the exhausted thread is passed into said mechanism as usual, and severed by the tying bill, the sheared-off portion being withdrawn by the tube 155 and the free end being wound up on the full cheese by the action of the roller 292. The cheese is thereafter transferred to the cam just as though a reserve thread had been tied thereto. When the feeler finger 347 reaches the unit, the full cheese is thrown out. The operative then replaces the full cheese with a core $c$.

The normal position of the stripper 270 and the reserve-thread-deflecting arms 252 and 252$^a$ is shown in Fig. 52. The position assumed by these parts when the feeler 368 engages a full cheese is shown in Figs. 53 and 54. 399 is a stationary stop which serves to limit the movement of the stripper 270 when the latter is moved into its normal position as in Fig. 52.

When desired, the belt-shifter lever 79 may be operated to disconnect the motor from the shaft 69, and the various mechanisms driven by the shafts 72 and 181 may then be manually actuated by means of cranks 400 (Figs. 33, 34, 35 and 38) fixed to a shaft 401. On the shaft 401 is splined a pinion 402 which may be slid into mesh with the spur gear wheel 197. The means for sliding the pinion 402 consists of a bell-crank 403 having a handle portion 404.

As indicated by the several cheeses $d$ shown in Fig. 40, the various instrumentalities mounted on the traveling carriage act concurrently on several winder units.

Although I have described the present embodiment of the machine in considerable detail, I would have it understood that the invention is not limited to the described construction and arrangement of the mechanisms, but that various changes may be made without departing from the spirit and scope of the invention.

In certain of the following claims I have used the term "winding couple" to denote two yarn masses, one of which is being rewound onto the other without regard to the size, form, character or location of such masses.

The cheese core $c$ and its supporting and locking means are claimed, respectively, in applications Serial Nos. 74,289 and 74,290, filed Jan. 26, 1916. Other of the mechanisms herein shown are claimed broadly in application Serial No. 133,981, filed Nov. 28, 1916.

I claim as my invention:

1. A winder-tending mechanism comprising a carriage; means for causing the carriage to travel; a cheese-rotating roll on said carriage; a suction device arranged adjacent to the rear end of the roll; a second cheese-rotating roll arranged rearwardly of the suction device; a down-take arm arranged to swing in the space between the suction device and the second roll; a third roll arranged rearwardly of the second roll; and means for driving said rolls, the third roll being driven at a higher peripheral speed than the other two rolls to furnish slack to the down-take arm.

2. A winder-tending mechanism comprising a carriage; means for causing the carriage to travel; a cheese-rotating roll on said carriage; a suction device arranged adjacent to the rear end of the roll; a second cheese-rotating roll arranged rearwardly of the suction device; a down-take arm arranged to swing in the space between the suction device and the second roll; a third roll arranged rearwardly of the second roll; a slack-take-up roll arranged rearwardly of the third roll; and means for driving said rolls, the slack-take-up roll being driven in the direction opposite to the direction of rotation of the other rolls, and the third roll being driven at a higher peripheral speed than the other two rolls to furnish slack to the down-take arm.

3. A winder-tending mechanism comprising a carriage; means for causing the carriage to travel; a cheese-rotating roll on said carriage; a suction device arranged adjacent to the rear end of the roll; a second cheese-rotating roll arranged rearwardly of the suction device; a down-take arm arranged to swing in the space between the suction device and the second roll; a third roll arranged rearwardly of the second roll; a slack-take-up roll arranged rearwardly of the third roll; means for driving said rolls, the slack-take-up roll being driven in the direction opposite to the direction of rotation of the other rolls, and the third roll being driven at a higher peripheral speed than the other two rolls to furnish slack to the down-take-arm; and means for raising and lowering the third roll to lift the cheese off the second roll and lower the cheese onto the slack-take-up roll.

4. In a winder-tending mechanism, a suction air tube having a mouth and a notch in its side adjacent to said mouth; a shear blade reciprocable across the mouth of said tube to sever a strand which is not in said notch; and a stationary blade coöperating with said reciprocable shear blade.

5. In a winder-tending mechanism; a suction air tube having a mouth and a notch in its side adjacent to said mouth; a shear blade reciprocable across the mouth of said tube, said blade being located within the tube and being spaced away from the notch; and a stationary blade coöperating with said reciprocable shear blade.

6. In a winder-tending mechanism; a knot-tying mechanism; a pivoted arm arranged to swing in one direction to carry a bight of an exhausted thread to a point adjacent to the knotter; means for carrying one strand of the bight into the knotter; and means for preventing the exhausted thread from being carried with said arm when the latter swings in the opposite direction.

7. In a winder-tending mechanism, end-finding means; a knotter; a down-take arm for carrying a bight of the found thread down to a point adjacent to the knotter; means for carrying a strand of said bight into the knotter; and means for preventing the exhausted thread from being carried with the down-take arm when the latter swings upwardly.

8. A winder comprising a series of winder units; a winder-tending mechanism arranged to travel along said series; and means moving with the winder-tending mechanism and located near the rear end thereof for detecting whether the threads of the units are in operative position.

9. A winder comprising a series of winder units; a winder-tending mechanism arranged to travel along said series, said mechanism comprising means for tying a reserve thread to an exhausted thread; and means traveling with the winder-tending mechanism and located rearwardly of the tying means for detecting the presence of the united thread.

10. A winder comprising a cheese-supporting lever; a carriage arranged to travel past said lever; a thread-detecting finger on said carriage; a member on said carriage arranged to engage a portion of the lever for throwing out the latter, said member normally yielding to pass said lever portion without affecting the latter; and means actuated by said thread-detecting finger for locking said member against yielding movement.

11. A winder comprising a cheese-supporting lever; a carriage arranged to travel past said lever; a thread-detecting finger on said carriage; a bell-crank on said carriage, one arm of said bell-crank being arranged to engage a portion of the lever for throwing out the latter, said arm normally yielding to pass said lever portion without affecting the latter; and a detent actuated by said thread-detecting finger to engage the other bell-crank arm for locking said bell-crank against yielding movement.

12. A winder comprising a series of movable yarn-mass supports; a carrige arranged to travel along said series; thread-detecting means on said carriage; and means on said carriage, controlled by said detecting means, for moving said supports into inoperative position.

13. In combination, a carriage; thread-detecting means on said carriage; a throw-out member on said carriage, said member being normally yielding, and means actuated by said thread-detecting means for locking said member against yielding movement.

14. In combination, a carriage; thread-detecting means on said carriage; a throw-out bell-crank on said carriage, said bell-crank being normally yielding; and a detent actuated by said thread-detecting means to engage one of the bell-crank arms for locking said bell-crank against yielding movement.

15. In a winder, a series of winder units, a winder-tending mechanism arranged to travel along said series, said mechanism comprising means for tying a reserve thread to an exhausted thread, and means traveling with the winder-tending mechanism for detecting the presence of the united threads.

16. In combination, a thread-carrying member movable to and fro, a thread stripper normally located adjacent to the path of said member; a thread-deflector; and means for withdrawing said stripper to prevent interference of the stripper with a deflected thread.

17. In a winder-tending mechanism; a knot-tying mechanism; a pivoted arm arranged to swing in one direction to carry a bight of an exhausted thread to a point adjacent to the knotter; means for carrying one strand of the bight into the knotter; and a relatively stationary stripper for preventing the exhausted thread from being carried with said arm when the latter swings in the opposite direction.

18. In combination, a knotter; means for carrying a bight of a thread to a point adjacent to the knotter; means for carrying a strand of said bight into the knotter; and a relatively stationary member adjacent to the path of the first carrying means for stripping the thread from the last mentioned carrying means upon the return movement of the latter.

19. In combination, a knotter; means for carrying a thread to a point adjacent to the knotter, a stripper normally adjacent to the path of said carrying means for stripping the thread from the carrying means, means for supporting a reserve thread, the first mentioned three elements being arranged to travel past the reserve thread supporting means, means for preventing the reserve thread from being engaged by the knot-tying mechanism; and means for removing said stripper out of the way of the reserve thread.

20. In combination, a knotter; means for carrying a bight of a thread to a point adjacent to the knotter; means for carrying a strand of said bight into the knotter; a stripper normally adjacent to the path of said carrying means for stripping the thread from the carrying means upon the return movement of the latter; means for supporting a reserve thread, the first mentioned four elements being arranged to travel past the reserve-thread-supporting means, means for preventing the reserve thread from being engaged by the knot-tying mechanism, and means for moving said stripper out of the way of the reserve thread.

21. In combination, a thread stripper, a thread deflector, and means for moving one of said elements into operative position and the other into inoperative position.

22. In combination, a cheese-rotating roll to unwind thread from a cheese, a member having a toothed edge in front of said roll, and a device to receive thread unwound from the cheese, said thread extending across said edge.

23. A winder having, in combination, means for moving a yarn mass into inoperative position, a device to gage the yarn mass when thrown out, means controlled by the gaging device for preventing a reserve thread from being tied to a full yarn mass, a device to return the gaged yarn mass to operative position, means for detecting the presence or absence of a running thread connected to said yarn mass, and means controlled by said detecting means for throwing the yarn mass out of operation characterized by the fact that all of said means and devices are mounted upon a carriage arranged to travel along the winder.

24. In a winder comprising a series of winder units, the combination of means arranged to travel along the series to detect the presence or absence of running threads in the units, and means controlled by said detecting means for throwing out yarn masses.

25. In a winder comprising a series of winder units, the combination of means arranged to travel along the series for detecting the presence or absence of running threads in the units, and means traveling with said detecting means and controlled by the detecting means for throwing out yarn masses.

26. A winder having, in combination, a series of winding units, and means arranged to travel along the series for selectively throwing units out of operation.

27. A winder having, in combination, yarn-mass-rotating means, a series of movable supports for supporting receiving yarn masses in contact with said rotating means, a carriage arranged to travel along the series, and means on said carriage for selectively engaging said supports to move them out of operative position.

28. A winder having, in combination, a row of winder units, a carriage arranged to travel along the row of units, and means on the carriage for selectively throwing the units out of operation.

29. A winder-tending mechanism having, in combination, a carriage; means for causing the carriage to travel; a cheese-unwinding roll on said carriage; a suction device arranged adjacent to the rear end of the roll; a cheese-unwinding roll arranged rearwardly of the suction device; a thread-carrying member arranged to swing in the space between the suction device and the second mentioned roll; a slack-take-up roll arranged rearwardly of the second mentioned roll; means for driving said rolls, the slack-take-up roll being driven in the direction opposite to the direction of rotation of the other rolls, and the second mentioned roll furnishing slack to the thread-carrying member; and means for raising and lowering the second mentioned roll.

30. In combination, a knotter; means for placing a thread in the knotter, said means including a member having a to-and-fro movement; and a relatively stationary member adjacent to the path of the first mentioned member for stripping the thread from the first mentioned member upon the return movement of the latter.

31. In combination, a knotter; means for placing a thread in the knotter, said means including a member having a to-and-fro movement; and means for preventing the exhausted thread from being carried with said member upon the return movement of the latter.

32. A winder-tending mechanism having, in combination, an end-finder; a knotter; means for moving a thread from the end-finder to the knotter; and means for stripping the thread from said thread-moving means.

33. The combination of means for revolving a cross-wound yarn mass, and a member across which runs the yarn of said yarn mass, said member having inclined teeth to limit the traverse of the yarn in one direction.

34. A winder having, in combination, a series of winder units each including a yarn mass support movable into and out of operative position; and a winder-tending mechanism arranged to travel along said series and including means for detecting whether the threads of the units are running, said winder-tending mechanism also including means for moving out of operative position the yarn mass supports of the units where threads are not running.

35. A winder having, in combination, a series of winder units and a winder-tending mechanism arranged to travel along said series and including means for detecting whether the units are in running condition, said winder-tending mechanism also including means for throwing out of operation such units as are not in running condition.

36. The combination of a winder unit, means arranged to travel past the unit for detecting whether the unit is in running condition, and means also arranged to travel past the unit and controlled by the detecting means for throwing the unit out of operation.

In testimony whereof I affix my signature in presence of two witnesses.

HOWARD D. COLMAN.

Witnesses:
 HARRY A. SEVERSON,
 DAVIS S. SPRAGUE.